United States Patent
Cunliffe et al.

(10) Patent No.: US 12,248,911 B2
(45) Date of Patent: Mar. 11, 2025

(54) USER INTERFACE COMPONENT GENERATION USING SERVICE AND/OR DURATION INFORMATION

(71) Applicant: Block, Inc., Oakland, CA (US)

(72) Inventors: Lee Cunliffe, San Francisco, CA (US); Edmond Chan, San Francisco, CA (US)

(73) Assignee: Block, Inc., Oakland, CA (US)

( * ) Notice: Subject to any disclaimer, the term of this patent is extended or adjusted under 35 U.S.C. 154(b) by 0 days.

(21) Appl. No.: 18/627,303

(22) Filed: Apr. 4, 2024

(65) Prior Publication Data

US 2024/0249247 A1    Jul. 25, 2024

Related U.S. Application Data

(63) Continuation of application No. 17/213,655, filed on Mar. 26, 2021, now Pat. No. 11,983,675, which is a (Continued)

(51) Int. Cl.
*G06Q 10/1093* (2023.01)
*G06F 3/0481* (2022.01)
(Continued)

(52) U.S. Cl.
CPC ....... *G06Q 10/1095* (2013.01); *G06F 3/0481* (2013.01); *G06N 20/00* (2019.01);
(Continued)

(58) Field of Classification Search
CPC .............. G06Q 10/1095; G06Q 10/02; G06Q 10/087; G06Q 20/102; G06Q 30/0623; G06Q 30/0643; G06Q 50/10; G06Q 20/0855; G06Q 20/12; G06Q 20/127; G06Q 20/202; G06F 3/0481; G06N 20/00
See application file for complete search history.

(56) References Cited

U.S. PATENT DOCUMENTS

| | | | |
|---|---|---|---|
| 6,694,300 B1 * | 2/2004 | Walker | G06Q 30/0215 705/26.81 |
| 8,374,894 B2 * | 2/2013 | Weinstock | G06Q 30/02 705/5 |

(Continued)

*Primary Examiner* — Michael Jared Walker
(74) *Attorney, Agent, or Firm* — Lee & Hayes, P.C.

(57) ABSTRACT

Methods and systems for a payment processing service (PPS) to receive transaction data for transaction(s) processed by the PPS; generate training data based on the transaction data that comprises, for individual transactions, a service, an employee, and a duration; training a duration-identification model using the training data, wherein the duration-identification model outputs a duration for a particular service with a particular employee; receiving, from a computing device of a customer, a request for an appointment for the service; determining, based at least in part on the duration-identification model and the service, a duration of the service with the particular employee; based at least in part on the duration, determining a proposed appointment with the employee for the service; and causing presentation of a user interface of the computing device of the customer that includes an indication of the proposed appointment. A customer-specific model may also be used.

20 Claims, 9 Drawing Sheets

Related U.S. Application Data continuation of application No. 15/799,523, filed on Oct. 31, 2017, now Pat. No. 10,963,846.

(51) Int. Cl.
| | |
|---|---|
| *G06N 20/00* | (2019.01) |
| *G06Q 10/02* | (2012.01) |
| *G06Q 10/087* | (2023.01) |
| *G06Q 20/10* | (2012.01) |
| *G06Q 30/0601* | (2023.01) |
| *G06Q 50/10* | (2012.01) |

(52) U.S. Cl.
CPC ........... *G06Q 10/02* (2013.01); *G06Q 10/087* (2013.01); *G06Q 20/102* (2013.01); *G06Q 30/0623* (2013.01); *G06Q 30/0643* (2013.01); *G06Q 50/10* (2013.01)

(56) References Cited

U.S. PATENT DOCUMENTS

| | | | |
|---|---|---|---|
| 8,583,511 B2* | 11/2013 | Hendrickson | H04L 67/52 705/14.65 |
| 9,064,285 B1* | 6/2015 | Nathoo | G06Q 40/125 |
| 9,111,307 B1* | 8/2015 | Hanni | G06Q 30/0613 |
| 9,779,432 B1* | 10/2017 | Shearer | G06Q 20/322 |
| 9,892,458 B1* | 2/2018 | Shearer | G06Q 20/24 |
| 10,853,763 B1* | 12/2020 | Armstrong | G06Q 10/087 |
| 10,937,004 B2* | 3/2021 | Comerford | G06Q 10/1095 |
| 10,963,846 B1* | 3/2021 | Cunliffe | G06F 3/0481 |
| 2001/0005831 A1* | 6/2001 | Lewin | G06Q 20/20 705/16 |
| 2003/0200148 A1* | 10/2003 | Razumov | G06Q 30/0633 705/7.36 |
| 2005/0060372 A1* | 3/2005 | DeBettencourt | G06Q 20/202 709/206 |
| 2005/0097005 A1* | 5/2005 | Fargo | G06Q 30/00 705/26.62 |
| 2006/0095333 A1* | 5/2006 | Gambhir | G06Q 10/087 705/28 |
| 2008/0004926 A1* | 1/2008 | Horvitz | G06Q 10/06316 705/7.26 |
| 2008/0005055 A1* | 1/2008 | Horvitz | G06Q 10/04 706/62 |
| 2008/0104631 A1 | 5/2008 | Krock et al. | |
| 2010/0191569 A1* | 7/2010 | Ellis | G06Q 30/02 705/7.19 |
| 2010/0205062 A1* | 8/2010 | Glatt | G06Q 30/00 705/40 |
| 2011/0093326 A1* | 4/2011 | Bous | G06Q 30/02 705/14.38 |
| 2011/0099042 A1* | 4/2011 | Yerkes | G06Q 10/109 705/7.19 |
| 2012/0066033 A1* | 3/2012 | Frohwein | G06Q 30/0207 705/14.1 |
| 2012/0131591 A1* | 5/2012 | Moorthi | G06F 9/5061 718/104 |
| 2012/0265587 A1* | 10/2012 | Kinkead | G06Q 30/02 705/14.1 |
| 2012/0278205 A1* | 11/2012 | Chin | G06Q 10/087 705/28 |
| 2012/0290349 A1* | 11/2012 | Burkhart | G06Q 30/06 705/7.13 |
| 2013/0132854 A1* | 5/2013 | Raleigh | G06F 3/0482 715/738 |
| 2013/0144675 A1 | 6/2013 | Ellis et al. | |
| 2013/0190072 A1* | 7/2013 | Nicholas | A63F 9/24 463/25 |
| 2014/0095232 A1* | 4/2014 | Shiva | G06Q 10/1093 705/7.11 |
| 2014/0108124 A1 | 4/2014 | Bous et al. | |
| 2014/0136259 A1 | 5/2014 | Kinsey et al. | |
| 2014/0136264 A1* | 5/2014 | Kinsey, II | G06Q 10/063116 705/7.19 |
| 2014/0136266 A1* | 5/2014 | Kinsey, II | G06Q 10/063116 705/7.19 |
| 2014/0156449 A1* | 6/2014 | Ganesan | G06Q 30/0631 705/26.7 |
| 2014/0278684 A1* | 9/2014 | Masciarelli | G06Q 30/0269 705/7.19 |
| 2014/0358766 A1* | 12/2014 | Nayyar | G06Q 40/03 705/38 |
| 2014/0365295 A1* | 12/2014 | Postrel | G06Q 30/0207 705/14.33 |
| 2015/0066762 A1* | 3/2015 | Chatterton | G06Q 20/322 705/44 |
| 2015/0095191 A1* | 4/2015 | Hu | G06Q 30/0613 705/26.41 |
| 2015/0100433 A1* | 4/2015 | Choy | G06Q 30/0635 705/26.81 |
| 2015/0363757 A1* | 12/2015 | Mocko | G07G 1/01 705/16 |
| 2015/0379553 A1* | 12/2015 | Copeland | G06Q 30/0239 705/14.39 |
| 2016/0019636 A1* | 1/2016 | Adapalli | H04L 67/10 705/26.81 |
| 2016/0042382 A1* | 2/2016 | Isaacson | G06Q 20/227 705/14.17 |
| 2016/0055538 A1* | 2/2016 | Todasco | G06Q 30/0261 705/14.58 |
| 2016/0071066 A1 | 3/2016 | Shiva et al. | |
| 2016/0078510 A1* | 3/2016 | Gadre | G06Q 30/0611 705/26.4 |
| 2016/0086222 A1* | 3/2016 | Kurapati | G06Q 40/08 705/14.53 |
| 2016/0098653 A1* | 4/2016 | Hojby | G06Q 10/0635 705/7.28 |
| 2016/0117662 A1* | 4/2016 | Bedier | G06Q 20/209 705/17 |
| 2016/0162936 A1* | 6/2016 | Khalil | G06Q 30/0261 705/14.52 |
| 2016/0260032 A1* | 9/2016 | Woon | G06Q 10/02 |
| 2016/0267404 A1* | 9/2016 | Shicoff | G06Q 50/01 |
| 2016/0300192 A1* | 10/2016 | Zamer | G06Q 30/0633 |
| 2016/0350721 A1* | 12/2016 | Comerford | H04L 67/306 |
| 2017/0061411 A1* | 3/2017 | Sherman | H04N 7/15 |
| 2017/0098197 A1* | 4/2017 | Yu | G16H 10/60 |
| 2017/0134335 A1* | 5/2017 | Goldstein | H04L 51/02 |
| 2017/0154180 A1 | 6/2017 | Chatterton et al. | |
| 2017/0178093 A1* | 6/2017 | Bull | G06Q 20/10 |
| 2017/0185967 A1* | 6/2017 | Dorner | A61M 16/0605 |
| 2017/0228808 A1* | 8/2017 | Kumar | G06Q 30/0264 |
| 2018/0114195 A1 | 4/2018 | Knight et al. | |
| 2018/0114263 A1* | 4/2018 | Knight | G06Q 30/0633 |
| 2018/0150818 A1 | 5/2018 | Mocko et al. | |
| 2018/0150825 A1* | 5/2018 | Myrick | G06Q 20/3224 |
| 2018/0197166 A1* | 7/2018 | Holman | G06Q 20/22 |
| 2018/0204188 A1 | 7/2018 | Ellis et al. | |
| 2018/0365739 A1* | 12/2018 | Koshy | G06Q 30/02 |
| 2019/0073644 A1* | 3/2019 | Isaacson | G06Q 30/0234 |
| 2021/0319407 A1 | 10/2021 | Cunliffe et al. | |

* cited by examiner

USER INTERFACE COMPONENT GENERATION USING SERVICE AND/OR DURATION INFORMATION

RELATED APPLICATIONS

This application claims priority to and is a continuation of U.S. patent application Ser. No. 17/213,655, filed on Mar. 26, 2021, which is a continuation of U.S. patent application Ser. No. 15/799,523, filed on Oct. 31, 2017, and issued as U.S. Pat. No. 10,963,846 on Mar. 30, 2021, the entire contents of which are incorporated herein by reference.

BACKGROUND

Merchants conduct transactions with customers for various types of items (e.g., goods, services, etc.) at physical establishments or locations of the merchants. Often, to provide customers with options to purchase items using varying payment instruments, merchants register with a service provider for use of a payment-processing service to process customer transactions on behalf of the merchants. As merchants continue to expand their business and/or services, these merchants may require additional services provided by the service provider. For instance, merchants may register with the service provider for use of an appointments service which provides electronic avenues for customers to schedule appointments to receive services provided by the merchants. While the amount of services provided by a service provider to merchants increases the capabilities of the merchants and satisfaction of both the merchants and their customers, merchants and/or customers may experience various difficulties when integrating data between services provided by the service provider.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
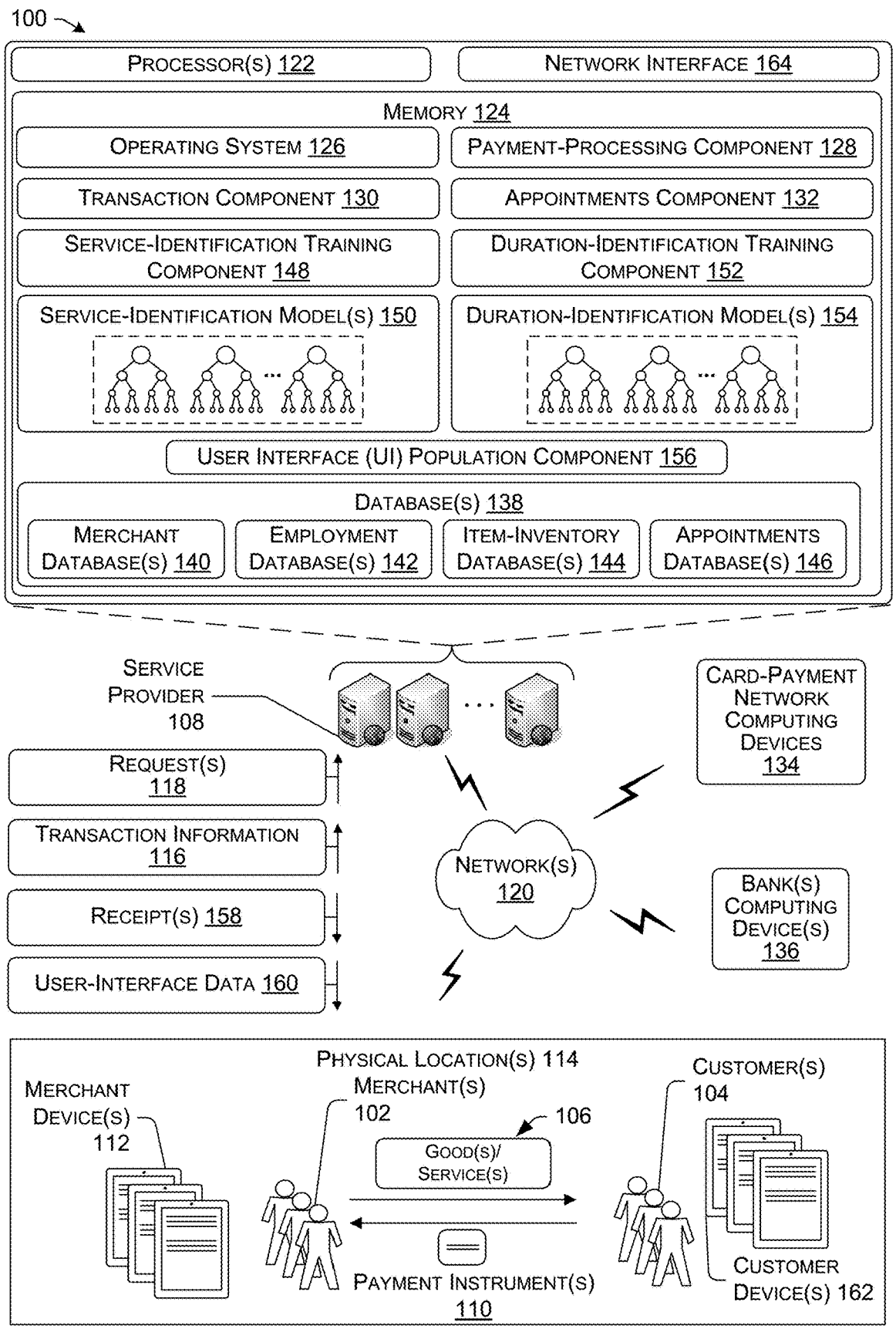
FIG. 1 illustrates an example environment illustrating techniques for determining what items (e.g., goods or services) offered for sale by a merchant are services, determining periods of time to perform the services, and populating interfaces of a merchant user interface with the services and periods of time.

This disclosure describes, in part, techniques for automated integration between services provided by a service provider to a merchant. The techniques described herein include the use of a service-identification model which is trained or configured to determine whether "items" (e.g., "goods" or "services") offered for sale (e.g., acquisition, rental, trade-in, etc.) by a merchant are services. Upon determining, using the service-identification model, that items offered for sale by the merchant are services provided by the merchant, the techniques may further include determining, using a duration-identification model, periods of time taken or required by the merchant to perform each of the services. Further, the techniques may include providing indications of the items that are services, and/or the periods of time to perform the services, to the merchant. For instance, a merchant website, a merchant point-of-sale (POS) device, or other electronic avenue that facilitates communication between customers and the merchant may present graphical user interfaces which are automatically populated with indications of merchant services, and/or periods of time required for performing the services, to enable customers to schedule appointments to receive the services.

Often, merchants may be registered for use, or otherwise permitted to use, services offered by a service provider. The various services offered to merchants by the service provider may include services such as payment-processing services to process transactions on behalf of merchants with their customers, employee-management services for managing employee shift schedules or employee compensation, appointments services for facilitating scheduling of appointments by customers with merchants who provide services, etc. In this way, the service provider, which may be implemented as a cloud-based service, may collect various data for providing these services to subscribing merchants. While the availability of these various services provides merchants with resources and/or functionality to help their businesses operate, grow, and interface with customers, difficulties may arise when integrating data between the different services provided by the service provider.

In some examples, a merchant may be registered for use of some, but not all, of the services offered by the service provider. For instance, a merchant may be registered with the service provider for use of the payment-processing service to process customer transactions on behalf of the merchant. In such examples, the service provider may store and obtain various types of information from the merchant, such as a catalog of items (e.g., goods or services) offered for sale by the merchant, prices for the items, an item inventory indicating amounts of items at locations of the merchant, etc., and use this data for processing the customer transactions.

In some examples, the merchant may further wish to register for use of an appointments service provided by the service provider to enable customers to access various electronic means (e.g., a merchant website, a user interface presented on a merchant (POS) device, etc.) to schedule an appointment (e.g., reservation at a restaurant, appointment at a hair salon, etc.) with the merchant for a service provided by the merchant. In order to provide the appointments service to the merchant, the service provider may attempt to identify services offered by the merchant by analyzing the items that the merchant currently offers for sale or acquisition using the payment-processing service. For instance, the service provider may analyze merchant databases storing item catalogs (e.g., listing of items offered by a merchant), inventory data (e.g., number of items a merchant has in one or more locations), or other indications of items offered for sale by the merchant using the payment-processing service. However, in some examples the payment-processing service may process all customer transactions for items in the same fashion, regardless of whether the item is a good or a service. Thus, despite storing a catalog of items for the merchant, the service provider may be unable to differentiate between whether an item offered for sale and listed in the catalog of items is a good or a service.

In some examples, the techniques described herein may include automated determination of whether an item offered for sale by a merchant is a good or a service. Some techniques of classifying and/or determining what items offered for sale by a merchant are services, as opposed to goods, may require the merchant to manually input which items listed in their catalog of items are services because computing devices may not have the capabilities of performing such tasks. Not only is this task cumbersome and error prone, but various inaccuracies often result from such techniques, such as a merchant missing services they offer, a merchant using language or terms that the payment system does not recognize or use internally, etc. The techniques described herein include the use of a specific set of rules to enable computing devices to more efficiently and accurately classify an item as a service, and may further include the auto-population of user interfaces associated with a merchant.

In some examples, a merchant may request to register for use of an appointments service provided by the service provider. For example, the merchant may already be registered for use of a payment-processing service provided by the service provider, and while logged into a merchant account system exposed by the service provider, provide input indicating that the merchant is also requesting use of an appointments service provided by the service provider. In such examples, one or more components and/or models may provide automated integration between information known from and used by the payment-processing service with the appointments service. For example, components of the service provider may "call," or otherwise communicate with the payment-processing service, to obtain indications of items offered for sale by the merchant using the payment-processing service. For example, the components may call or parse through the catalog of items to obtain all items, or a subset of items, provided by the merchant.

Upon obtaining a list of items offered for sale by the merchant using the payment-processing system, the components of the processing service may determine, using natural language processing/understanding techniques, which of the items are services offered by the merchant. In some examples, determining which of the items are services may include the use of one or more models trained to determine whether an item is a service, such as a service-identification model. For example, the components of the service provider may input indications of the items into the service-identification model, and receive as output from the service-identification model, indications of which items are services based on analyzing data of known services associated with other similar merchants, for example. In some examples, the components may input indications of the items, such as names of the items (e.g., "haircut" for a hair salon, "shampoo" for a carpet cleaning business, etc.) into the service-identification model. In various examples, the service-identification model may analyze the names of the items, which may include representing the names of the items as numbers or other machine-readable text, and determine whether the names of the items correspond to services. In some instances, the service-identification model may be one or more classifiers configured and/or trained to classify the items as services based on the names of the items. For example, the service-identification model may be any type of classifier or combination of classifiers, such as a decision tree classifier, a random forest classifier, a neural network classifier, a Naïve Bayes classifier, a logistical regression classifier, or any other types of classifiers.

The service-identification model may receive the names, or other identifiers, for the items as inputs, and output indications of whether or not the items are services. In some examples, for each item name received as an input, the service-identification model may simply output a binary decision (e.g., "yes" or "no") regarding whether or not the item is a service. In other examples, the service-identification model may be trained to output confidence values which indicate a likelihood that, based on the item name, the item is a service offered by the merchant. The confidence value, which may comprise a numeric value in a numeric scale (e.g., 0-1, 0-10, 0-100, etc.), may then be compared to a threshold confidence value to determine whether the corresponding item is a service. For example, an item name of "shampoo" may be input into the service-identification model, and a confidence value of 0.70 may be output by the service-identification model, where a confidence value of 0.0 represents a good, and a confidence value of 1.0 represents a service. In some examples, the threshold confidence value may be determined, such as by using feedback techniques, such that names of items whose confidence values are greater than the threshold confidence value have a high likelihood of being a service (e.g., 95% chance of being a service, 98% of being a service, 100% change of being a service etc.). Thus, if a name of an item is input into the service-identification model, and a confidence value for the name of the item is greater than the threshold confidence value (e.g., 0.5, 0.075, 0.90, etc.), then the components of the service provider may determine that the corresponding item is a service offered by the merchant.

The service-identification model may be trained using various techniques to determine whether a name of an item corresponds to a service. For example, a service-identification training component may be configured to train the service-identification model using various types of training data uniquely available to the service provider. As noted above, the service provider may provide the various types of services (e.g., payment-processing service, appointments service, employee-management service, etc.) to a plurality of merchants over geographically disparate areas, and thus has unique access to various types of information to which merchants do not have access. Thus, the service-identification training component may use data available to the service provider to train the service-identification model.

In some examples, the service-identification model may obtain actual names of services from catalogs of services of the other merchants who use the appointments service. Thus, the service-identification model may use actual service names as training data, which serve as indications of what services may be named. Further, the service-identification training component may obtain, from a merchant database and/or an item-inventory database, indications of completed/itemized sales of completed transactions performed by the payment-processing service, where the itemized sales have actual completed transactions for goods, the names of the goods, the number of goods, and a price for the transaction. Thus, the service-identification training component may use the indications of actual service names listed in catalogs of services of other merchants using the appointments service as first training data to train the service-identification model to identify names of items as names of services, and the service-identification training component may further use the names of goods from itemized sales to train the service-identification model to identify names of items as names of goods.

In some examples, the service-identification training component may train the service-identification model to identify items as services which are bookable services. For instance, certain types of services may not be bookable, e.g., do not have appointments that a customer can book. Alternatively, certain types of services are bookable services in that a customer may book the service for a period of time. Thus, the service-identification training component may determine which services offered by the merchant, and/or the other merchants who provide services, are actually bookable services. The service-identification training component may then train the service-identification model to identify items as bookable services in order to provide indications of the bookable services to the merchants and/or customers to facilitate appointment scheduling for the periods of time to perform the services.

After receiving, from the service-identification model, indications of items offered for sale by a merchant that are services, the components of the service provider may further input the services into a duration-identification model which is configured to determine periods of time to perform the services of the merchant. In some examples, the duration-identification model may be trained by a duration-identification training component which obtains, from actual catalogs of services stored at the service provider, periods of time scheduled by other merchants to perform the same, or similar, services. The duration-identification model may receive indications of the services, such as names of the services, and output indications of periods of time to perform the services.

In addition to be trained using actual periods of time scheduled to perform similar, or the same, services by other merchants, the duration-identification model may further be trained using other types of data. For example, the duration-identification model may further be trained using descriptions of services included in the catalogs of services. In this way, even if a service of a merchant does not match with a service known by the duration-identification model, a description of the service and another service included in the catalogs of services may be sufficiently similar such that a time for the mismatching service may be determined or estimated. For example, a merchant who owns a hair salon may provide a "hair dyeing" service as an input into the duration-identification model, but the duration-identification model may only include an indication of a period of time for a "hair coloring" service provided by another merchant. In such an example, despite the names of the services not matching, the descriptions of the services may be similar enough, based on a comparison using natural language processing, such that the duration-identification model may output a determined period of time for the "hair dyeing" as being the same as the period of time indicated for the "hair coloring."

In further examples, the duration-identification model may be further trained for specific employees and/or customers. For instance, the duration-identification model may be trained using data stored in a merchant database, such as transaction information (e.g., time stamps, services performed in a particular day, customer identification, employee identification, etc.), as well as information stored in an employee database (e.g., shift schedules, customers the employees work with, etc.), and determine periods of time to perform a service based on this information. As an example, the duration-identification model may be trained to adjust periods of time to perform services based on how fast particular employees traditionally perform the services. For example, if a particularly fast employee works on a Tuesday, the periods of time scheduled to perform one or more services on Tuesday may be shorter than periods of time for the same service on Wednesday when a slower employee works.

The components of the service provider may then receive, as an output from the duration-identification model, indications of periods of time to perform the services of the merchant. The components of the service provider may further include a user interface (UI) population component which outputs service information including (i) indications of the items which are services, and (ii) periods of time required/taken to perform these services. In various examples, the UI population component may simply send these indications to a merchant computing device of the merchant, and in other examples, the UI population component may perform operations for populating a website or other electronic interface of the merchant with the service information. For instance, the UI population component may identify a website associated with the merchant, a user interface presented on point-of-sale (POS) devices of the merchant, or other electronic means to communicate with the merchant, and populate one or more graphical user interfaces with the names of the services provided by the merchant and with the periods of time for performing the services. For example, the UI population component may populate a service UI with indications of the services provided by the merchant, where the services are selectable, and further populate a service-duration UI with indications of the periods of time to perform the services, as well as dates and times that appointments for the services are available. The user interfaces associated with the website or other electronic communication means of the merchant may be configured such that, upon receiving a selection of a service and a selection for an appointment for the service, the website may send an indication that an appointment for a service was booked, and the appointment for that date and time may be removed from the UI of the merchant website.

The techniques described herein enable computing devices to perform operations previously not performable by computing devices using a specific set of rules. For instance, computing devices were previously unable to intelligently differentiate between services and goods, and were further unable to determine periods of time to perform services. Thus, integration between various services provided by a service providers was unavailable with the use of computing devices. Further, the techniques described herein improve upon previous techniques, such as manually inputting information, by reducing errors, improving accuracy through intelligent identification and auto-populating of service information on a consumer-facing interface, and further by harnessing data previously unavailable in prior art techniques to merchants.

As noted above, the service provider collects a variety of data for merchants located in geographically disparate locations across cities, states, or countries. The unique placement of the service provider, and the unique services provided the service provider, may result in the service provider having access to large amounts of information and knowledge that individual merchants are unable to obtain or harness on their own. In this way, unique insights and analytics may be obtained by the service provider to provide merchants with intelligent services and recommendations. For instance, the service provider is able to harness this information to more accurately determine what items are services, and further accurately determine periods of time to perform services. If a merchant is attempting to open a new location in a geographic area that it is unfamiliar with, the techniques described herein improve upon previous techniques by providing an indication of periods of time to perform services at the new location, such as by using similar data from similar merchants in that area. Further, errors are reduced using the techniques described herein. Previously, merchants may be required to manually input their services and/or periods of time for performing these services. However, merchants may be unaware of specific names and/or durations used to describe and perform services. Thus, a merchant may input a service name that the service provider does not understand, which may result in internal processing errors at the service provider (e.g., misclassifying a service for tax purposes, misclassifying a service as a good, etc.), or an incorrect duration that causes errors in scheduling (possibly leading to reduced profits and/or schedule conflicts). The techniques described herein reduce these types of errors by accurately classifying items with appropriate services names.

The following description provides specific details for a thorough understanding and an enabling description of these implementations. One skilled in the art will understand, however, that the disclosed system and methods may be practiced without many of these details. Additionally, some well-known structures or functions may not be shown or described in detail, so as to avoid unnecessarily obscuring the relevant description of the various implementations. The terminology used in the description presented below is intended to be interpreted in its broadest reasonable manner, even though it is being used in conjunction with a detailed description of certain specific implementations of the disclosed system and methods. Some frequently used terms are now described.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

The term "component" refers broadly to software stored on non-transitory storage medium (e.g., volatile or non-volatile memory for a computing device), hardware, or firmware (or any combination thereof) modules. Components are typically functional such that they that may generate useful data or other output using specified input(s). A component may or may not be self-contained. An application program (also called an "application") may include one or more components, or a component may include one or more application programs.

The preceding introduction is provided for the purposes of summarizing some examples to provide a basic understanding of aspects of the subject matter described herein. Accordingly, the above-described features are merely examples and should not be construed as limiting in any way. Other features, aspects, and advantages of the subject matter described herein will become apparent from the following description of Figures and Claims.

FIG. 1 illustrates an example environment 100 illustrating techniques for determining what items (e.g., goods or services) offered for sale by a merchant are services, determining periods of time to perform the services, and populating interfaces of a merchant user interface with the services and periods of time.

The environment 100 of FIG. 1 includes one or more merchants 102 conducting transactions with one or more customers 104 for one or more items 106 (e.g., goods and services), as well as a service provider 108 to authorize one or more payment instruments 110 of the customers 104 for the transactions. The example environment 100 illustrates interactions between the merchants 102, customers 104, and service provider 108 for collecting various data, identifying what items offered for sale by a merchant are services, determined periods of time to perform the services, and populating one or more user interfaces associated with a merchant 102 with indications of the services and periods of time to perform the services. In some examples, the user interfaces that are populated with the services and periods of time to perform the services are configured to facilitate the use of an appointments service provided by the service provider 108, such as by automated scheduling of appointments for a service provided by a merchant 102.

In some examples, a merchant 102 may be registered for services provided by the service provider 108, such as a payment-processing service. Thus, the service provider 108 may perform or offer various services through which the service provider 108 obtains data associated with merchants 102, employees of the merchants 102, and other types of data. For instance, the service provider 108 may perform transactions between the merchants 102 and customers 104 of the merchants 102. The transactions performed on behalf of the merchants 102 may be initiated at or by one or more merchant devices 112. As used in herein, merchant devices 112 may comprise any sort of mobile or non-mobile devices (e.g., electronic devices) that include instances of application(s) that execute on the respective merchant devices 112. The application(s) may provide POS functionality to the merchant devices 112 to enable merchants 102 (e.g., owners, employees, etc.) to at least accept payments from the customers 104. In some types of businesses, the merchant devices 112 may correspond to a store or other place of business of the merchants, and thus, may be a fixed location that typically does not change on a day-to-day basis. In other types of businesses, however, the location of the merchant devices 112 may change from time to time, such as in the case that the merchants 102 operate a food truck, is a street vendor, is a cab driver, etc., or has an otherwise mobile business, e.g., in the case the merchants 102 sell items at buyer's homes, places of business, and so forth. In either of the examples above, the place of business of the merchants 102 may be referred to as a merchant location or a physical location 114. It should be noted that, in some instances, the merchants 102 may be conducting transaction with customers 104 outside of physical locations 114. For instance, the customers 104 may be using respective electronic devices to purchase goods/service(s) 106 from merchants 102 via e-commerce businesses associated with the merchants 102.

Additionally, as used herein, a merchant 102 may include any business or individual engaged in the offering of items (e.g., goods or services) for sale to customers 104. Actions attributed to a merchant 102 may include actions performed by owners, employees, or other agents of the merchant 102, and thus no distinction is made herein unless specifically discussed. In addition, as used herein, a customer 104 may include any entity that acquires goods or services from a merchant 102, such as by purchasing, renting, leasing, borrowing, licensing, or the like. Hereinafter, goods and/or services offered by merchants 102 may be referred to solely as items. Thus, a merchant 102 and a customer 104 may interact with each other to conduct a transaction in which the customer 104 acquires an item from a merchant 102, and in return, the customer 104 provides payment to the merchant 102.

As used herein, a transaction may include a financial transaction for the sale or obtaining of items and/or services that is conducted between customers 104 and merchants 102. For example, when paying for a transaction, the customer 104 can provide the amount that is due to the merchant 102 using cash or other payment instrument 110 (e.g., a debit card, a credit card, a stored-value or gift card, a check, through an electronic payment application on a device carried by the customer 104, or the like). The merchant 102 can interact with the merchant devices 112 to process the transaction, such as by inputting (e.g., manually, using a magnetic card reader or an RFID reader, etc.) identifiers (e.g., payment information, such as a card number, account number, or any other account information) associated with the payment instrument 110. For example, a payment instrument 110 of the customer 104 may include one or more magnetic strips for providing card and customer information when swiped in a card reader. In other examples, the payment instrument 110 may include other types of payment cards may be used, such as smart cards having a built-in memory chip that is read by the device when the card is "dipped" into the reader, a radiofrequency identification tag, or so forth.

In various examples, the merchant devices 112 may send transaction information to the service provider 108 over one or more networks 120. In some examples, the transaction information 116 may generally represent details involving a payment transaction between the merchants 102 and customers 104. Generally, the network(s) 120 may be any type of network, such as a local area network or a wide area network, such as the Internet, and may include a wireless network, such as a cellular network, a local wireless network, such as Wi-Fi and/or close-range wireless communications, such as Bluetooth® and Bluetooth® low energy, a wired network, or any other such network, or any combination thereof. Accordingly, the one or more networks 120 may include both wired and/or wireless communication technologies, including Bluetooth®, Bluetooth® low energy, Wi-Fi, and cellular communication technologies, as well as wired or fiber optic technologies. Components used for such communications can depend at least in part upon the type of network 120, the environment selected, or both. Consequently, one or more computing devices of the environment 100 may communicatively couple to the one or more networks 120 in any manner, such as by a wired or wireless connection.

During a transaction between a merchant 102 and a customer 104, the merchant devices 112 can determine the transaction information 116 describing the transaction, such as the payment information of the payment instrument 110, an amount of payment received from the customer 104, the goods/service(s) 106 acquired by the customer 104, a time, place and date of the transaction, a card network associated with the payment instrument 110, an issuing bank of the payment instrument 110, a name of the customer 104, a name or other identifier for an employee who interacted with a customer 104 for a particular transaction, indications of tip amounts for the purchase transactions, and so forth. The merchant devices 112 can send the transaction information 116 to the service provider 108 over the networks 120, either substantially contemporaneously with the conducting of the transaction (in the case of online transactions) or later when the device is in the online mode (in the case offline transactions).

Generally, merchants 102 may offer their services based on a schedule of appointments or similar scheduling of services (e.g., reservations at restaurants, waitlists for salons, etc.). However, managing appointments (e.g., creating appointments, updating appointments in response to customer requests or changes in the merchant's 102 schedule, etc.) may represent a significant burden on merchants 102. Thus, various merchants 102 associated with the service provider 108 may further be registered for use of an appointments service provided by the service provider 108. The appointments service may provide and handle appointments related services on behalf of the merchants 102, such as providing electronic means (e.g., websites, user interfaces presented on merchant POS devices, etc.) for scheduling appointments with customers 104, handling changes in previously made appointments prior to the appointment time, managing un-booked and booked appointment slots of a merchant's schedule, etc. Thus, the service provider 108 may receive and store various information for merchants 102 who subscribe to the appointments service, such as indications of services provided, prices of the services, descriptions of the services, periods of time to perform the services, transition time between performing services, goods used in performing the services, etc.

In some examples, a merchant 102 may be registered for use of the payment-processing service of the service provider 108 to process transactions on behalf of the merchant 102. The merchant 102 may further request, or register, for use of the appointments service provided by the service provider 108. For example, the merchant 102 may log into a merchant account interface exposed by the service provider 108 (e.g., account website), and select one or more options indicating a request to register for use of the appointments service provided by the service provider 108. The service provider may then receive one or more requests 118 from the merchant devices 112 indicating that the merchant 102 would like to register for use of the appointments service.

The service provider 108 may include one or more processors 122 and memory 124, which may store an operating system 126, a payment-processing component 128, a transaction component 130, and an appointments component 132. In some examples, the service provider 108 may be implemented as one or more computing devices, such as servers, laptop computers, desktop computers, and so on. The one or more computing devices may be configured in a cluster, a farm, a data center, a cloud computing environment, or a combination thereof. In one example, the one or more computing devices of the service provider 108 provide cloud computing resources, including computational resources, storage resources, and the like.

The payment-processing component 128 may function to receive the transaction information 116 regarding the transaction from the merchant devices 112 and attempt to authorize the payment instrument 110 used to conduct the transaction. The payment-processing component 128 may then send an indication of whether the payment instrument 110 has been approved or declined back to the merchant devices 112. Generally, when a merchant 102 and a customer 104 enter an electronic payment transaction, the transaction is processed by electronically transferring funds from a financial account associated with the customer 104 to a financial account associated with the merchant 102. As such, the payment-processing component 128 may communicate with one or more computing devices of a card-payment network (or "card payment network") 134, e.g., MasterCard®, VISA®, over the network 120 to conduct financial transactions electronically. The payment-processing component 128 can also communicate with one or more computing devices of one or more banks 136, processing/acquiring services, or the like over the network 120. For example, the payment-processing component 128 may communicate with an acquiring bank, and/or an issuing bank, and/or a bank maintaining customer accounts for electronic payments.

An acquiring bank may be a registered member of a card association (e.g., Visa®, MasterCard®), and may be part of a card payment network. An issuing bank may issue payment instruments 110 to customers 104, and may pay acquiring banks for purchases made by customers 104 to which the issuing bank has issued the payment instruments 110. Accordingly, in some examples, the computing devices of an acquiring bank may be included in the card-payment network 134 and may communicate with the computing devices of a card-issuing bank to obtain payment. Further, in some examples, a customer 104 may use a debit card instead of a credit card, in which case, the bank computing devices of a bank corresponding to the debit card may receive communications regarding a transaction in which the customer 104 is participating. Additionally, there may be computing devices of other financial institutions involved in some types of transactions or in alternative system architectures, and thus, the foregoing are merely several examples for discussion purposes.

In the example environment 100 of FIG. 1, the service provider 108 may receive various types of data from the merchant devices 112 and store the data in the databases 138. The databases 138 may be stored at one physical location, or across different physical locations and comprise any number of databases. The service provider 108 may receive the transaction information 116 from the merchant devices 112 and store it in one or more merchant databases 140. The transaction information 116 may comprise any type of information collected during transactions between merchants 102 and customers 104, including, but not limited to, the payment information of the payment instrument 110, an amount of payment received from the customer 104, the goods/service(s) 106 acquired by the customer 104, a time, place, and date of the transaction, a card network associated with the payment instrument 110, an issuing bank of the payment instrument 110, a name of the customer 104, a name or other identifier for an employee who interacted with a customer 104 for a particular transaction, indications of tip amounts for the purchase transactions, and so forth. The transaction information may be stored in the merchant databases 140 with indications of which merchants 102 performed the transactions.

In some examples, the service provider 108 may further receive employee information from the merchants 102, and store the employee information in one or more employment databases 142. The employee information may generally comprise any type of information associated with employees of the merchants 102, such as names or other identifiers for the employees, what hours the employees work and/or have worked, what shifts the employees work or are scheduled to work (e.g., shift schedule), which physical locations 114 of the merchants 102 the employees work for their shifts, which transactions individual employees processed (and thus which customers 104 the employees interacted with), and other data associated with employees. The service provider 108 may then store the employee information in the employment database(s) 142. The service provider 108 may further store indications of merchants 102 that employ the employees.

In various examples, the transaction component 130 may further manage one or more item-inventory databases 144 based on the transaction information 116 received from the merchant devices 112 of the merchant 102. As noted above, the merchant devices 112 may perform transactions with customers 104 on behalf of the merchants 102. Each of the merchant devices 112 may comprise POS devices which have a POS application executing thereon. The POS applications may receive, via the merchant devices 112 (e.g., via associated payment instrument readers), a plurality of payment data from various customers 104 to perform transactions at each of the physical locations 114. The POS applications may further cause the merchant devices 112 to send transaction data 116, including the payment data and an indication of items (e.g., goods, services, etc.) exchanged, to the service provider 108. The transaction component 130 then stores the transaction data in the merchant databases 140, and further updates indications of item inventories for the merchants 102 in one or more item-inventory databases 144. In some examples, the service provider 108 may track, or otherwise obtain, inventory information for items the merchants 102 have in their respective physical locations 114. When the service provider 108 receives transaction data from POS devices 112, it may update the item inventory indications in the inventory database 144. Thus, the item-inventory database(s) 144 may store indications of what items are offered for sale by merchants 102.

Further, the item-inventory database(s) 144 may store catalogs of items 106 offered for sale by the merchants 102. Generally, the catalogs of the items 106 may provide a listing of items 106 offered for sale by the merchants 102, where the items 106 are listed using identifiers such as names of the items, numeric identifiers for the items, stock keeping unit (SKU) codes for the items, etc. Thus, the transaction component 130 may identify which items were involved in a transaction between merchant(s) 102 and customer(s) 104 using the catalog of items 106, and further updates the item-inventory database(s) 144 based on the transaction information 116.

In various examples, the appointments component 132 may be configured to perform various techniques for managing the scheduling of appointments for merchants 102 who subscribe to an appointments service of the service provider 108. For example, the appointments component 132 may provide and handle appointments related services on behalf of the merchants 102, such as providing/managing electronic means (e.g., websites, user interfaces presented on merchant POS devices 112, etc.) for scheduling appointments with customers 104, handling changes in previously made appointments prior to the appointment time, managing un-booked and booked appointment slots of a merchant's 102 schedule, etc. Thus, the appointments component 132 may receive and store various information for merchants 102 who subscribe to the appointments service, such as indications of services provided, prices of the services, descriptions of the services, periods of time to perform the services, transition time between performing services, goods used in performing the services, indications of employees who performed various services, indications of particular customers 104 receiving various services, etc. The appointments component 132 may store this service-related information in one or more appointments databases 146 to manage the scheduling and transactions for services on behalf of the merchants 102 who subscribe to the appointments service.

In some examples, the appointments component 132 may receive a request 118 from a merchant 102 to register for use of the appointments service. For instance, the merchant 102 may already be registered for use of the payment-processing service provided by the service provider 108, and may log into a merchant account interface to request a subscription to the appointments service. Upon receiving the request 118 from the merchant 102, the appointments component 132 may determine whether or not the merchant 102 is registered for use of the payment-processing service provided by the service provider 108.

Service-Identification Techniques

In some examples, a service-identification training component 148 may train or otherwise configure one or more service-identification models 150 to perform actions for identifying whether an item offered for sale by the merchant 102 is a service, as opposed to a good. For example, the service-identification training component 148 may be configured to train the service-identification model 150 by executing one or more machine-learning algorithms which use various types of training data uniquely available to the service provider 108. As noted above, the service provider 108 may provide the various types of services (e.g., payment-processing service, appointments service, employee-management service, etc.) to a plurality of merchants 102 over geographically disparate areas, and thus have unique access to various types of information to which merchants do not have access. Thus, the service-identification training component 148 may use data available to the service provider to train the service-identification model 150.

In some examples, the service-identification training component 148 may obtain actual names of services from catalogs of services stored in the appointments databases 146 offered by other merchants who use the appointments service. Thus, the service-identification training component 148 may use actual service names as training data, which serve as indications of what names may be associated with actual services offered by the other merchants 102. Further, the service-identification training component 148 may obtain, from the merchant databases 140 and/or the item-inventory databases 144, indications of completed/itemized sales of completed transactions for goods performed by the payment-processing service, where the itemized sales have actual completed transactions for goods, the names of the goods, the number of goods, and a price for the transaction. Thus, the service-identification training component 148 may use the indications of actual service names listed in catalogs of services of other merchants 102 using the appointments service as first training data to train the service-identification model 150 to identify names of items as names of services. Further, the service-identification training component 148 may use the names of goods from itemized sales to train the service-identification model 150 to identify names of items as names of goods. Further description of the training techniques performed by the service-identification training component 148 may be found in the description corresponding to FIG. 3 below.

In some examples, the service-identification model(s) 150 may be trained output a binary indication of whether or not an item is a service (e.g., "yes" of "no", "1" or "0", etc.). In some examples, the service-identification model(s) 150 may instead output a confidence value which indicates, based on a numeric scale (e.g., 0-1, 0-10, 0-100, etc.), a likelihood that a name of an item 106 corresponds to a service. In some examples, if the confidence value is over a threshold confidence value, the item 106 may be determined to be a service. The threshold confidence value may be determined, as described more below with reference to FIG. 3, using feedback techniques to accurately indicate what items are services.

Thus, in some examples, if the appointments component 132 determines that the merchant 102 requesting use of the appointments service is registered for use of the payment-processing service provided by the service provider 108, one or more automated actions may be performed responsive to receiving the request 118. For instance, the appointments component 132 may "call", or otherwise communicate with (e.g., search, parse, receive, etc.) catalogs of items 106 stored in the item-inventory database(s) 144. The appointments component 132 may identify the names (or other identifiers) of the items offered for sale by the requesting merchant 102 from the merchant's catalog of items that is maintained in the item-inventory database 144, and input the names of the items into the service-identification model(s) 150. The service-identification model(s) 150 may then analyze the names of the items, using one or more types of classifiers (e.g., decision tree classifiers, random forest classifiers, neural network classifiers, Naïve Bayes classifiers, logistical regression classifiers, etc.), and output a confidence value indicating a likelihood that, based on the item name, the item is a service offered by the merchant 102. The confidence value may then be compared to a threshold confidence value to determine whether the corresponding item is a service. The appointments component 132 may then determine which of the items have corresponding confidence values which are greater than the threshold confidence value indicating that the items are services, and store indications of which items are associated with names (or other identifiers) indicated by the service-identification model(s) 150 as corresponding to services.

Duration-Identification Techniques

In some examples, a duration-identification training component 152 may train or otherwise configure one or more duration-identification model(s) 154 to perform actions for determining or identifying periods of time taken or to perform services. For example, the duration-identification training component 152 may be configured to train the duration-identification model(s) 154 by executing one or more machine-learning algorithms which use various types of training data uniquely available to the service provider 108. In some examples, the duration-identification training component 152 may identify, from the appointments database(s) 146, catalogs of services that are performed by other merchants 102 who subscribe to the appointments service provided by the service provider 108. The duration-identification training component 152 may further identify, from the catalogs of actual services provided by the other merchants 102, indications of the services (e.g., names, numeric identifiers, etc.), as well as periods of time required or taken by the other merchants 102 to perform each of the services 102.

The duration-identification training component 152 may associate the names of the services with the periods of time to perform the services, and use this data as training data for training the duration-identification model(s) 154 to determine periods of time to perform services of a merchant 102. The duration-identification training component 152 may execute one or more machine-learning algorithms to train, using the period of time training data, the duration-identification model(s) 154 to determine or estimate periods of time to perform the services of the merchant 102. As described herein, the machine-learning algorithms, such as the algorithms used by the service-identification training component 148 and/or the duration-identification training component 152, may comprise any type of machine-learning algorithm, such as decision tree training algorithms, Naïve Bayes training algorithms, regression training algorithms, Support Vector Machine (SVM) training algorithms, etc., to create corresponding classifiers for the models 150 and/or 154. In this way, the duration-identification training component 152 may train the duration-identification model(s) 154 to determine periods of time for services of a merchant 102 who is newly subscribing to the appointments service based on the same, or similar services, offered by other merchants via their catalogs of services stored at the service provider 108.

In some examples, the duration-identification training component 152 may further use other types of training data to configure or train the duration-identification model(s) 154 to determine or estimate periods of time for a merchant 102 to perform services. For example, the duration-identification model 154 may further be trained using descriptions of services included in the catalogs of services for other merchants 102. In this way, even if a service of a merchant 102 does not match with a service known by the duration-identification model 154, a description the service and another service included in the catalogs of services may be sufficiently similar such that a time for the mismatching service may be determined or estimated. For example, a merchant who owns a hair salon may provide a "hair dyeing" service as an input into the duration-identification model 154, but the duration-identification model 154 may only include an indication of a period of time for a "hair coloring" service provided by another merchant 102. In such an example, despite the names of the services not matching, the descriptions of the services may be similar enough, based on a comparison using natural language processing, such that the duration-identification model may output a determined period of time for the "hair dyeing" as being the same as the period of time indicated for the "hair coloring."

In further examples, the duration-identification model 154 may further be trained for specific employees and/or customers 104. For instance, the duration-identification model 154 may be trained using data stored in the merchant database(s) 140, such as transaction information 116 (e.g., time stamps, services performed in a particular day, customer identification, employee identification, etc.), as well as information stored in the employment database(s) 142 (e.g., shift schedules, customers the employees work with, etc.), and determine periods of time to perform a service based on this information. As an example, the duration-identification model 154 may be trained to adjust periods of time to perform services based on how fast particular employees traditionally perform the services. For example, if a particularly fast employee works on a Tuesday, the periods of time scheduled to perform services on Tuesday may be shorter than periods of time for a Wednesday when a slower employee works. Similarly, the duration-identification model 154 may be trained to adjust periods of time to perform services based on how long it takes particular customers 104 to have services performed. For instance, one customer 104 may have longer or thicker hair that requires a longer period of time to color or dye, while other customers may have short hair that does not take as long to color or dye. The duration-identification model 154 may analyze transaction information 116 stored in the merchant database(s) 140 to determine, based on time stamp information, how long services take to perform for certain customers 104. As an example, a first customer 104 may pay for their hair service at 2:00 PM, a second customer may pay for the same hair service at 2:40 PM, and a third customer may pay for the same hair service at 4:00 PM. In this way, certain customers 104 may be associated with different periods of time for the same service.

In some examples, the duration-identification model 154 may further be trained based on other characteristics of the services, such as price. For instance, at a particular hair salon, a men's haircut may cost roughly $20, and a woman's haircut may cost roughly $45. Although the service is a "haircut" in both instances, based on the price of the service, the time may be adjusted accordingly, such as the men's haircut being scheduled for 40 minutes, and a woman's haircut being scheduled for 60 minutes. In some examples, the duration-identification model 154 may further be trained to adjust or determine the periods of time for services based on geographical locations. As an example, if a merchant is putting in a new shop at a new geographic location, the duration-identification model 154 may be trained to identify average periods of time taken by other merchants 102 to perform the same, or similar service, based on that location. In some examples, a highly populated location may result in faster turn-around of services due to demand, whereas less populated locations may have slower turn-around of services.

In some examples, the duration-identification model 154 may be trained to determine the periods of time based on a transition time taken between services. For instance, a salon may have to clean up hair after a haircut, a massage therapist may have to change bedding for their massage tables, a tanning salon may have to clean tanning beds after a use, etc. The duration-identification model 154 may be trained to take into account, or otherwise include, the transition times for services which include transition times.

In examples where the duration-identification model 154 is unable to determine a period of time for a name of a service received as an input, the duration-identification model 154 may assign a default period of time (e.g., 30 minutes, 1 hour, etc.) for the service. In some examples, the default period of time may be based on an average of all of the periods of time indicated in the catalog of services, while in other examples, the default period of time may be based on an average period of time for services provided by other merchants in a same industry, or an average period of time taken for the other services provided by the merchant offering the service for which the period of time cannot be determined.

In various examples, once the service-identification model(s) 150 have determined names for the services included in the items 106 of the merchant 102, and the duration-identification model(s) 154 have determined periods of time taken or to perform the services, a user interface (UI) population component 156 may provide the information to the merchant. In some examples, the UI population component 156 may be configured to transform or otherwise format the names/indications of the services and the periods of time to perform the services into data that may be rendered on a UI presented on a display. In some examples, the appointments service offered by the service provider 108 may include templates of default presentation formats for UI's that the merchant's 102 may use. In some examples, the merchant's may have a website, a UI presented on merchant POS devices 112 at the physical location(s) 114, or other electronic means that the UI population component 156 may identify and populate. For instance, the UI population component 156 may send the generated UI data 160 to the merchant device(s) 112, which in turn populate UI's presented on displays of the merchant device(s) 112. In some examples, the UI population component 156 may alternatively, or additionally, identify a website of the merchant and populate graphical user interfaces of the website with the UI data 160 corresponding to the names of the services, and the periods of time to perform those services. In some examples, the UI's of the merchant may include one or more UIs, such as a service GUI which presents indications of the names of the services offered by the merchant 102. In some examples, as described in more detail in FIG. 4, the indications of the names of the services may be selectable by a customer 104 of the merchant 102, such as by use of an input device associated with customer device(s) 162 of the customers 102. Upon receiving selection of name of a service, the website (or other electronic communications means) may present a service-duration GUI which indicates periods of time, or appointments, on various dates that the customer 102 may further select using their customer device(s) 162. Upon receiving a selection of the service and date/time to receive the service, the device presenting the merchant UI (e.g., customer device(s) 162, merchant POS device(s) 112, etc.) may send this information to the service provider 108, whereby the appointments component 132 may update the appointments for the merchant 102 in the appointments database(s) 146. Further, the UI population component 156 may send data to the merchant's UIs indicating that the particular date/time for the service provided by the merchant 102 is now booked.

In various examples, the duration-identification training component 152 may further train the duration-identification model(s) 154 using feedback provided from the merchant 102. For example, the merchant 102 may interact with the merchant website or other electronic means which presents the data indicating the periods of time for the services provided by the merchant 102. In some examples, the merchant 102 may manually alter periods of time for one or more of the services provided by the merchant to be shorter periods of time, or longer periods of time. In such examples, the service provider 108 may determine that the merchant 102 manually changed a period of time determined by the duration-identification model(s) 154 to a different period of time. The duration-identification training component 152 may analyze the change in the period of time made by the merchant 102, and adjust the duration-identification model(s) 154 to change a period of time determined for the respective service. For instance, the duration-identification training component 152 may train the duration-identification model(s) 154 to associated a longer, or shorter, period of time for the service based on the manual input of the merchant 102 that adjusted the period of time. In this way, the duration-identification training component 152 may adjust or modify the duration-identification model(s) 154 based on feedback received for the determined periods of time.

In the example of FIG. 1, the service provider 108 further includes one or more network interfaces 164 for communicating over the networks 120. The network interface(s) 164, along with any other network interface(s) described herein, may include one or more interfaces and hardware components for enabling communication with various other devices over the network 120 or directly. For example, network interface(s) 164 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

As discussed herein, processor(s), such as processor(s) 122, may comprise one or more processors or processing cores. For example, the processor(s) can be implemented as one or more microprocessors, microcomputers, microcontrollers, digital signal processors, central processing units, state machines, logic circuitries, and/or any devices that manipulate signals based on operational instructions. In some cases, the processor(s) may be one or more hardware processors and/or logic circuits of any suitable type specifically programmed or configured to execute the algorithms and processes described herein. The processor(s) can be configured to fetch and execute computer-readable processor-executable instructions stored in the memory.

Additionally, as discussed herein, memory, such as memory 124, may be an example of tangible non-transitory computer storage media and may include volatile and nonvolatile memory and/or removable and non-removable media implemented in any type of technology for storage of information such as computer-readable processor-executable instructions, data structures, program modules or other data. The memory may include, but is not limited to, RAM, ROM, EEPROM, flash memory, solid-state storage, magnetic disk storage, optical storage, and/or other computer-readable media technology. Further, in some cases, devices, such as merchant devices, the service provider 108, a customer device, or the like, can access external storage, such as RAID storage systems, storage arrays, network attached storage, storage area networks, cloud storage, or any other medium that can be used to store information and that can be accessed by the processor(s) directly or through another computing device or network. Accordingly, the memory may be computer storage media able to store instructions, modules or components that may be executed by the processor(s). Further, when mentioned, non-transitory computer-readable media exclude media such as energy, carrier signals, electromagnetic waves, and signals per se.

Additional functional components of the service provider 108 may include the operating system 126 for controlling and managing various functions of the service provider 108 and for enabling basic user interactions with the service provider 108.

Figure 2:
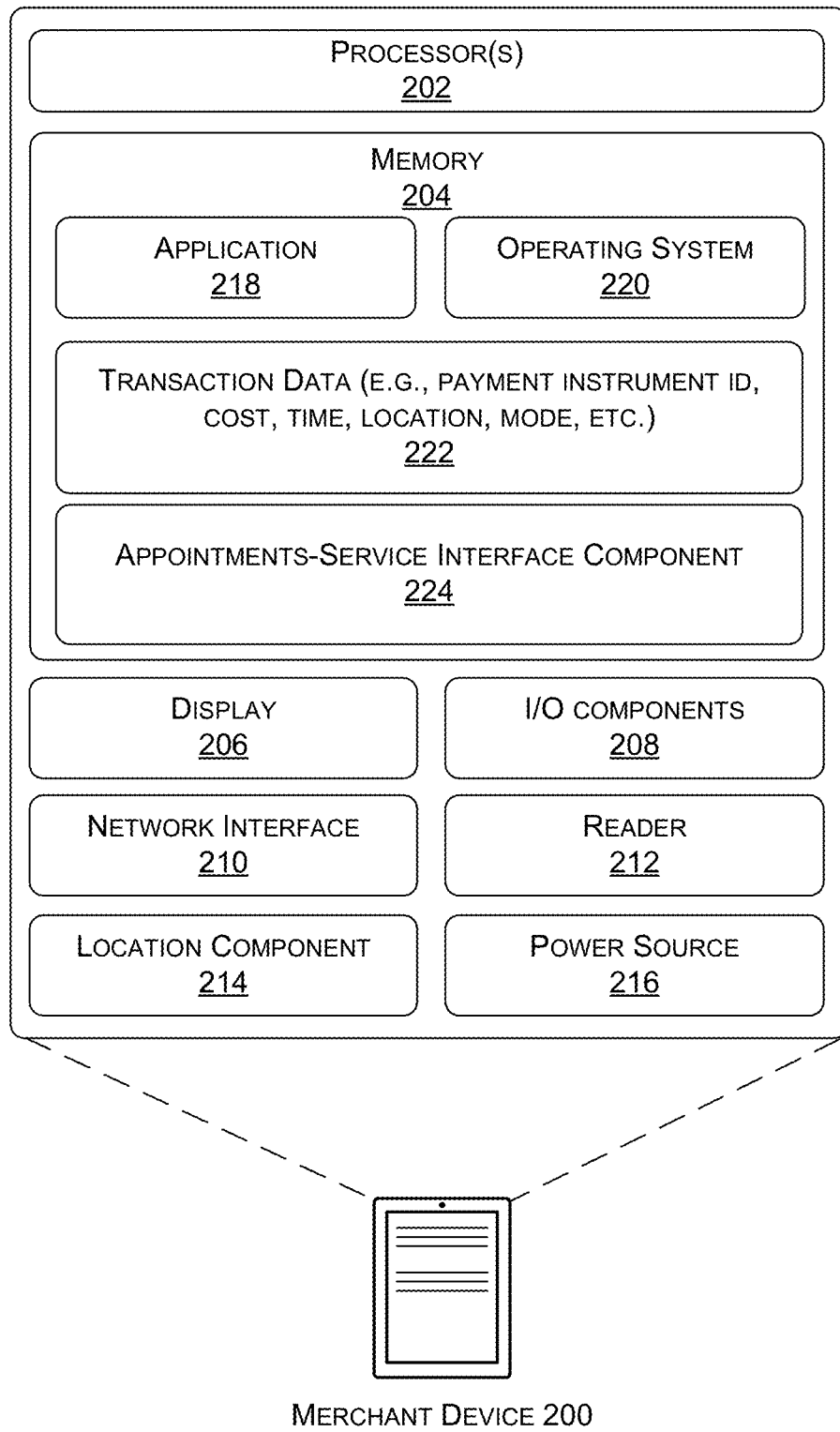
FIG. 2 illustrates components of a merchant device.

FIG. 2 illustrates select example components of an example merchant device 200 according to some implementations. The merchant device 200 may include any of the merchant devices 112 from FIG. 1. The merchant device 200 may be any suitable type of computing device, e.g., mobile, semi-mobile, semi-stationary, or stationary. Some examples of the merchant device 200 may include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; or other computing devices capable of sending communications and performing the functions according to the techniques described herein.

In the illustrated example, the merchant device 200 includes at least one processor 202, memory 204, a display 206, one or more input/output (I/O) components 208, one or more network interfaces 210, at least one card reader 212, at least one location component 214, and at least one power source 216. Each processor 202 may itself comprise one or more processors or processing cores. For example, the processor 202 can be implemented as one or more microprocessors, microcomputers, microcontrollers, digital signal processors, central processing units, state machines, logic circuitries, and/or any devices that manipulate signals based on operational instructions. In some cases, the processor 202 may be one or more hardware processors and/or logic circuits of any suitable type specifically programmed or configured to execute the algorithms and processes described herein. The processor 202 can be configured to fetch and execute computer-readable processor-executable instructions stored in the memory 204.

Depending on the configuration of the merchant device 200, the memory 204 may be an example of tangible non-transitory computer storage media and may include volatile and nonvolatile memory and/or removable and non-removable media implemented in any type of technology for storage of information such as computer-readable processor-executable instructions, data structures, program modules or other data. The memory 204 may include, but is not limited to, RAM, ROM, EEPROM, flash memory, solid-state storage, magnetic disk storage, optical storage, and/or other computer-readable media technology. Further, in some cases, the merchant device 200 may access external storage, such as RAID storage systems, storage arrays, network attached storage, storage area networks, cloud storage, or any other medium that can be used to store information and that can be accessed by the processor 202 directly or through another computing device or network. Accordingly, the memory 204 may be computer storage media able to store instructions, modules or components that may be executed by the processor 202. Further, when mentioned, non-transitory computer-readable media exclude media such as energy, carrier signals, electromagnetic waves, and signals per se.

The memory 204 may be used to store and maintain any number of functional components that are executable by the processor 202. In some implementations, these functional components comprise instructions or programs that are executable by the processor 202 and that, when executed, implement operational logic for performing the actions and services attributed above to the merchant device 200.

Functional components of the merchant device 200 stored in the memory 204 may include a merchant application 218, which may interact with applications executing on client devices to allow customers to pay for items offered by the merchant. The merchant application 218 may present an interface on the merchant device 200 to enable the merchant to conduct transactions, receive payments, and so forth, as well as communicating with the service provider for processing payments and sending transaction information. Further, the merchant application 218 may present an interface to enable the merchant to manage the merchant's account, and the like. Finally, the merchant application 218 may send data associated with the merchant, employees, and/or items (e.g., goods, services, etc.) to the service provider 108, and receive UI data 160 from the service provider 108.

Additional functional components may include the operating system 220 for controlling and managing various functions of the merchant device 200 and for enabling basic user interactions with the merchant device 200. The memory 204 may also store transaction data 222 that is received based on the merchant associated with the merchant device 200 engaging in various transactions with customers, such as customers 104 from FIG. 1.

Further, the memory 204 may further store an appointments-service interface component 224. Generally, the appointments-service interface component 224 may comprise instructions for presenting UIs to display and receive information associated with the appointments service provided by the service provider 108. For instance, the appointments-service interface component 224 may cause the display 206 to present UI data 160 received from the UI population component 156 of the service provider. The appointments-service interface component 224 may present UIs for facilitating the scheduling of appointments, such as the service GUI and service-duration GUI described above, and in more detail below with respect to FIGS. 4 and 5. For instance, the appointments-service interface component 224 may cause presentation of indications of services provided by the merchant 102 associated with the merchant device 200, as well as dates/periods of time that customers 104 may book to receive the services from the merchant 102. The appointments-service interface component 224 may further send indications of the input received from a customer 104 via the merchant device 200, such as bookings for appointments offered by the merchant 102.

In addition, the memory 204 may also store data, data structures and the like, that are used by the functional components. For example, this data may include item information that includes information about the items offered by the merchant, which may include images of the items, descriptions of the items, prices of the items, and so forth. Depending on the type of the merchant device 200, the memory 204 may also optionally include other functional components and data, which may include programs, drivers, etc., and the data used or generated by the functional components. Further, the merchant device 200 may include many other logical, programmatic and physical components, of which those described are merely examples that are related to the discussion herein.

The network interface(s) 210 may include one or more interfaces and hardware components for enabling communication with various other devices over the network or directly. For example, network interface(s) 210 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein. In some examples, the network interface(s) 210 may be used to send various information across networks, such as networks 120. For instance, the network interface(s) 210 may send data such as transaction information and/or employee information described with respect to FIG. 1.

FIG. 2 further illustrates that the merchant device 200 may include the display 206 mentioned above. Depending on the type of computing device used as the merchant device 200, the display 206 may employ any suitable display technology. For example, the display 206 may be a liquid crystal display, a plasma display, a light emitting diode display, an OLED (organic light-emitting diode) display, an electronic paper display, or any other suitable type of display able to present digital content thereon. In some examples, the display 206 may have a touch sensor associated with the display 206 to provide a touchscreen display configured to receive touch inputs for enabling interaction with a graphic interface presented on the display 206. Accordingly, implementations herein are not limited to any particular display technology. Alternatively, in some examples, the merchant device 200 may not include the display 206, and information may be present by other means, such as aurally.

The I/O components 208, meanwhile, may include speakers, a microphone, a camera, and various user controls (e.g., buttons, a joystick, a keyboard, a keypad, etc.), a haptic output device, and so forth. For instance, I/O components 208 can include a printing device for printing physical receipts for customers. In some examples, the POS device uses the printing device to print the physical receipts after receiving data representing the receipts from a service provider.

It should be noted that, in some examples, the I/O components 208 may be separate from the merchant device 200. For instance, the printing device may be separate from the merchant device 200. In some examples, the merchant device 200 sends data representing the receipts to the printing device to cause the printing device to print physical receipts.

In addition, the merchant device 200 may include or may be connectable to a payment instrument reader 212. The payment instrument reader 212 may be communicatively coupled to the merchant device 200, but located exterior the merchant device 200. For instance, the reader 212 may be connected to the merchant device 200 via a wireless network. In some examples, the reader 212 may plug in to a port in the merchant device 200, such as a microphone/headphone port, a data port, or other suitable port. In other instances, the reader 212 is integral with the entire merchant device 200. The reader 212 may include a read head for reading a magnetic strip of a payment card, and further may include encryption technology for encrypting the information read from the magnetic strip. Alternatively, numerous other types of card readers may be employed with the merchant device 200 herein, depending on the type and configuration of a particular merchant device 200.

The location component 214 may include a GPS device able to indicate location information, or the location component 214 may comprise another other location-based sensor. The merchant device 200 may also include one or more additional sensors (not shown), such as an accelerometer, gyroscope, compass, proximity sensor, and the like. Additionally, the merchant device 200 may include various other components that are not shown, examples of which include removable storage, a power control unit, and so forth.

Figure 3:
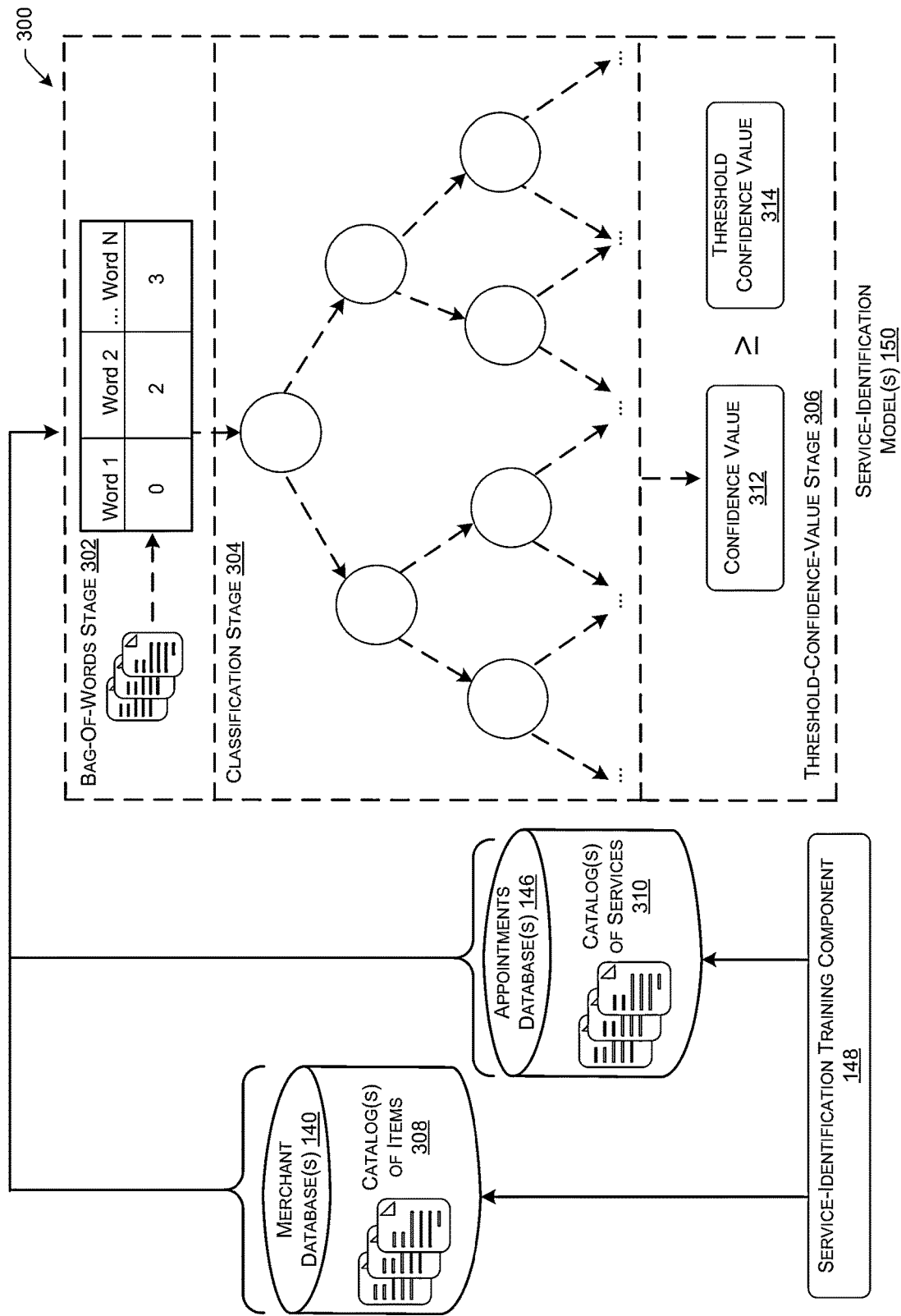
FIG. 3 illustrates an environment for training a service-identification model to determine whether an item is a service.

FIG. 3 illustrates an environment 300 for training a service-identification model 150 to determine whether an item is a service. In some examples, the process for training the service-identification model 150 may include various stages, such as a bag-of-words stage 302, a classification stage 304, and a threshold-confidence-value stage 306. However, in other example, various stages or portions of stages may be added, removed, or modified to train the service-identification model(s) 150.

To train the service-identification model(s) 150, the service-identification training component 148 may call, or otherwise obtain, training data. In some examples, the training data may be stored at the service provider 108, such as in the merchant database(s) 140 and/or the appointments database(s) 146. For example, the service-identification training component 148 may obtain one or more catalogs of items 308 stored or associated with the merchant database(s) 140. In some examples, the catalogs of items may include indications of items that are offered for sale by merchants 102 associated with the service provider. Further, the service-identification training component 148 may obtain, from the merchant database(s) 140 (and/or the item-inventory database(s) 144), indications of completed/itemized sales of completed transactions performed via the payment-processing service, where the itemized sales have actual completed transactions for goods, the names of the goods, the number of goods, a price for the transaction, etc. Thus, the service-identification training component 148 may obtain names of items which are actually goods. For instance, by analyzing transactions to determine what quantity of items were sold, analyzing the item-inventory database(s) 144 to determine what items are associated with an inventory, and by analyzing catalogs of items 308 indicating names of items, the service-identification training component 148 may determine names of items which are goods, as opposed to services. In some examples, the names of the goods may serve as a first set of training data.

Further, the service-identification training component 148 may call, or otherwise obtain, one or more catalogs of services 310 stored or associated with the appointments database(s) 310. As described above, the catalog(s) of services 310 may indicate what services are offered by merchants 102 who use the appointments service offered by the service provider 108. Thus, the catalog(s) of services 310 may include names of services provided by all, or some, of the merchants 102 who use the appointments service. Thus, the names of services obtained from the catalog(s) of services 310 may serve as a second set of training data.

In some examples, the service-identification training component 148 may further obtain other types of data from the catalog(s) of items 308 and/or the catalog(s) of services 310, such as descriptions of the goods/services used in the first set of training data and the second set of training data, prices listed for the goods/services, etc. The descriptions, prices, and other data may be associated with, and included with, the respective names of the goods or services used in the first and second sets of training data.

The service-identification training component 148 may input the first set of training data (e.g., names of items that are goods, descriptions, price, etc.) and the second set of training data (e.g., names of items that are services, descriptions, price, etc.) into the one or more stages for training the service-identification model(s) 150. For example, a first stage may comprise a bag-of-words stage 302 where the training data is converted into a more simplified representation for natural language processing. Generally, a bag-of-words representation represents text as a count, or "bag", of words in the text, while disregarding the grammar, order, and proximity of words in the text.

After representing the training data sets using a simpler representation, the service-identification training component 148 may execute one or more machine-learning algorithms at the classification stage 304, where the machine-learning algorithms use the training data sets to train the service-identification model(s) 150 to determine whether a name of an item corresponds to a service. For instance, the service-identification training component 148 may correlate, augment, or otherwise associate the names of the goods in the first set of training data with a numeric value indicating that the names correspond to goods (e.g., 0), and further correlate, augment, or otherwise associated the names of the services in the second set of training data with a different numeric value indicating that the names correspond to services (e.g., 1, 10, etc.). The machine-learning algorithms may generally comprise any type of algorithms configured to train a classifier, or other model, including, but not limited to, decision tree training algorithms, Naïve Bayes training algorithms, regression training algorithms, Support Vector Machine (SVM) training algorithms, etc. While illustrated as a random forest classifier, the service-identification model(s) 150 may comprise any type of model or classifier. The machine-learning algorithms may train the service-identification model(s) 150, using the first and second sets of training data and associated number values (e.g., 0, 1, etc.) to output indications of whether names of items are services or goods. For example, using the representations of the names of the goods, the corresponding descriptions, and/or corresponding prices, along with the numeric indicator that the name corresponds to a good (e.g., 0), the service-identification model(s) 150 may determine that names of items which are the same as, or similar to, names of the goods used in the first set of training data are also names of goods. Similarly, using the representations of the names of the services, the corresponding descriptions, and/or corresponding prices, along with the numeric indicator that the name corresponds to a service (e.g., 1), the service-identification model(s) 150 may determine that names of items which are the same as, or similar to, names of the services used in the second set of training data are also names of services.

Accordingly, the service-identification model(s) 150 may be trained to receive names of items, potentially along with other data (e.g., descriptions, prices, etc.), and output a confidence value somewhere in the range of the two numeric values (e.g., 0-1, 0-10, etc.) that indicates a likelihood that the name of the item input into the service-identification model(s) 150 correspond to a good, or a service.

In some examples, for each item name received as an input, the service-identification model(s) 150 may simply output a binary decision (e.g., "yes" or "no") regarding whether or not the item is a service. In other examples, the service-identification model(s) 150 may further be trained to include a third stage, or the threshold-confidence-value stage 306. For instance, the service-identification model(s) 150 may be trained to output confidence values 312 which indicate a likelihood that, based on the item name, the item is a service offered by the merchant. At the threshold-confidence-value stage 306, the service-identification model(s) 150 may be trained to compare the output confidence values 312 for each of the names of the items with a threshold confidence value 314 to determine whether the corresponding item is a service. For example, an item name of "shampoo" may be input into the service-identification model, and a confidence value 312 of 0.70 may be output by the service-identification model, where a confidence value 312 of 0.0 indicates a good, and a confidence value 312 of 1.0 indicates a service. In some examples, the threshold confidence value 314 may be determined, such as by using feedback techniques, such that names of items whose confidence values are greater than the threshold confidence value 314 have a high likelihood of being a service (e.g., 95% chance of being a service, 98% of being a service, 100% change of being a service etc.). Thus, if a name of an item is input into the service-identification model(s) 150, and a confidence value 312 for the name of the item is greater than the threshold confidence value 314 (e.g., 0.5, 0.075, 0.90, etc.), then the service-identification model(s) 150 may determine that the corresponding item is a service offered by the merchant 150.

In some examples, as noted above, descriptions, prices, and/or other data may be used to determine whether an item is a service or a good. For instance, if a name of an item is "shampoo", this could indicate that the item is a good or a service. However, the description for the item may be "cleaner for your carpet" which may indicate the item is a good, or the description for the item may be "one-hour house cleaning" which may indicate that the item is a service. Similarly, a price for the item "shampoo" of $12 may indicate that the item is a good, whereas a price of the item "shampoo" of $80 may indicate that the item is a service. In even further examples, a type of the business may be taken into account. For instance, if the business is a wholesaler, the service-identification model(s) 150 may be trained to weight or otherwise output confidence values 312 indicating that the items of the wholesaler are goods. Further, names of businesses may be used to differentiate between whether a business primarily offers goods, or services. As an example, a business named "Rick's Heating & Cooling Service" may suggest that, by having the word "service" in the business name, that the service-identification model(s) 150 may be trained to weight items offered for sale by the business as being services.

While the techniques described for training the service-identification model(s) 150 are described with reference to using names of the items for classifying the items as the item indicators, other types of item indicators may similarly be used (e.g., images using image recognition/representation, SKU numbers, etc.). Further, the service-identification model(s) 150 need not include various stages, such as the bag-of-words stage 302 and/or the threshold-confidence-score stage 306. Further, other types of representations may be used other than a bag-of-words representation.

Example User Interfaces

Figure 4:
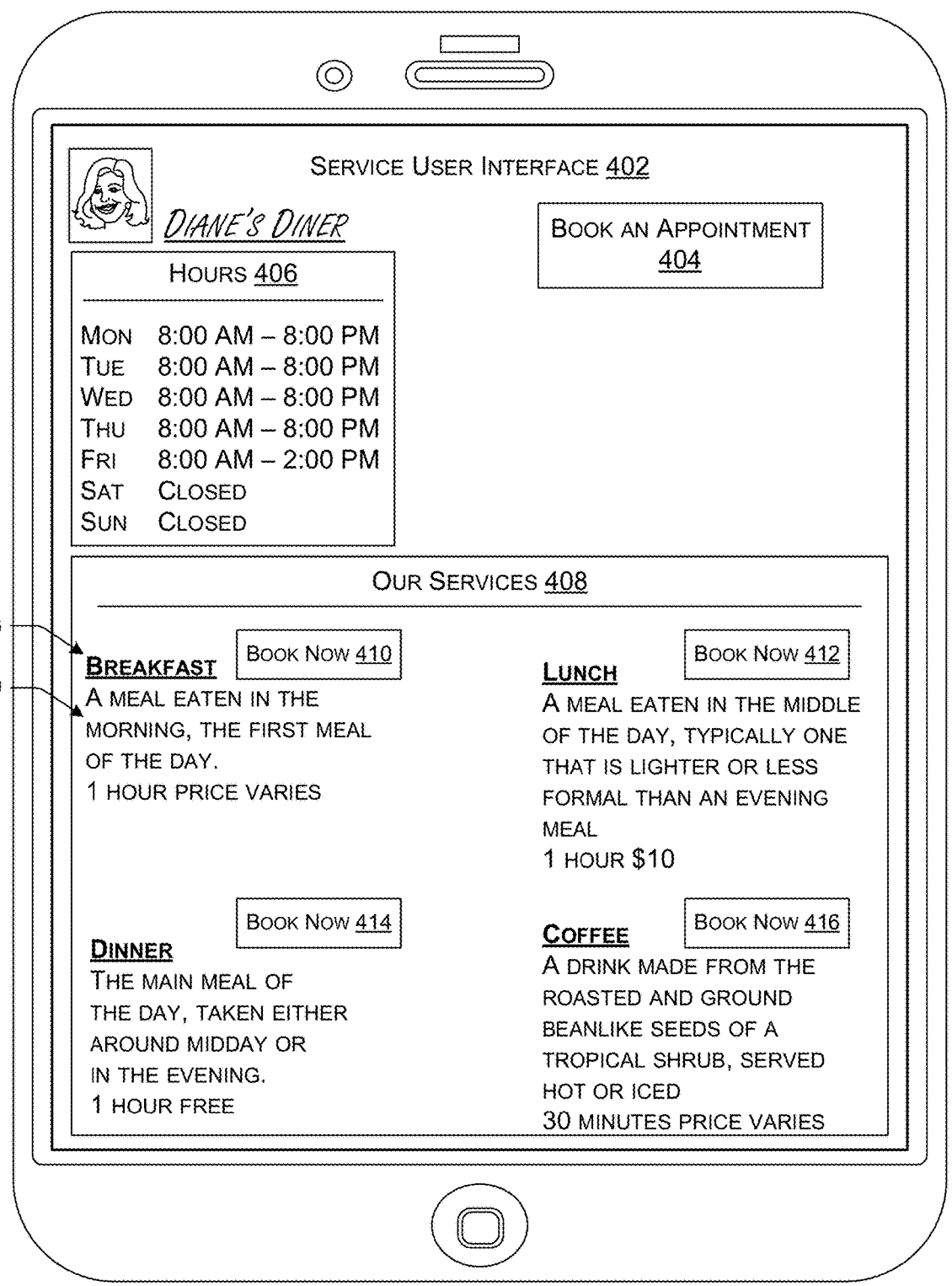
FIG. 4 illustrates an example service user interface presented on a device which presents indications of services provided by a merchant.

FIG. 4 illustrates an example service user interface (UI) 402 presented on a device 400 which presents indications of services provided by a merchant 102. In some examples, the device 400 may be a merchant device 112, such as a customer-facing merchant POS device. In other examples, the device 400 may be a customer device 162. For instance, the service UI 402 may be hosted or otherwise associated with a website of the merchant 102.

In some examples, the service UI 402 may provide an electronic communication means through which customers 104 may register for an appointment with a merchant 102 using the appointments service of the service provider 108. As illustrated, the service UI 402 may have a selectable option 402 to book an appointment with the merchant 102. Further, the service UI 402 may include other information for the merchant, such as the hours 406 of the merchant. The service UI 402 may include an indication of the services 408 provided by the merchant (e.g., breakfast, lunch, dinner, coffee, etc.), as well as options 410, 412, 414, and 416 to select and book the services.

In some examples, the services 408 may include a name 418 of the services, as well as a description 420 of the services. Generally, the data included in the services 408 portion of the service UI 402 may be determined and populated by the UI population component 156 of the service provider 108. For instance, the UI population component 156 may receive indications of the names of the services determined by the service-identification model(s) 150, and further receive or determine (e.g., from the catalog(s) of items 308) the descriptions 420 of the services. Further, the UI population component 156 may further be configured to identify a location at which the service UI 402 is stored or hosted. In some examples, an indication of a merchant website may be stored in the merchant database(s) 140 which indicate the merchant website hosting the service UI 402, and in other examples, the UI population component 156 may determine that the merchant POS device(s) 112 are additionally, or alternatively, presenting the service UI 402. The UI population component 156 may be configured to populate the service UI 402 with the names 418 of the services determined for the merchant 102, and/or the descriptions 420 of the services. In some examples, the UI population component 156 may further populate the service UI 402 with indications of prices for the services.

In various examples, upon receiving input from a customer 104 to book one of the services presented on the service UI 402, the customer 104 may be taken to, or presented with, another UI.

Figure 5:
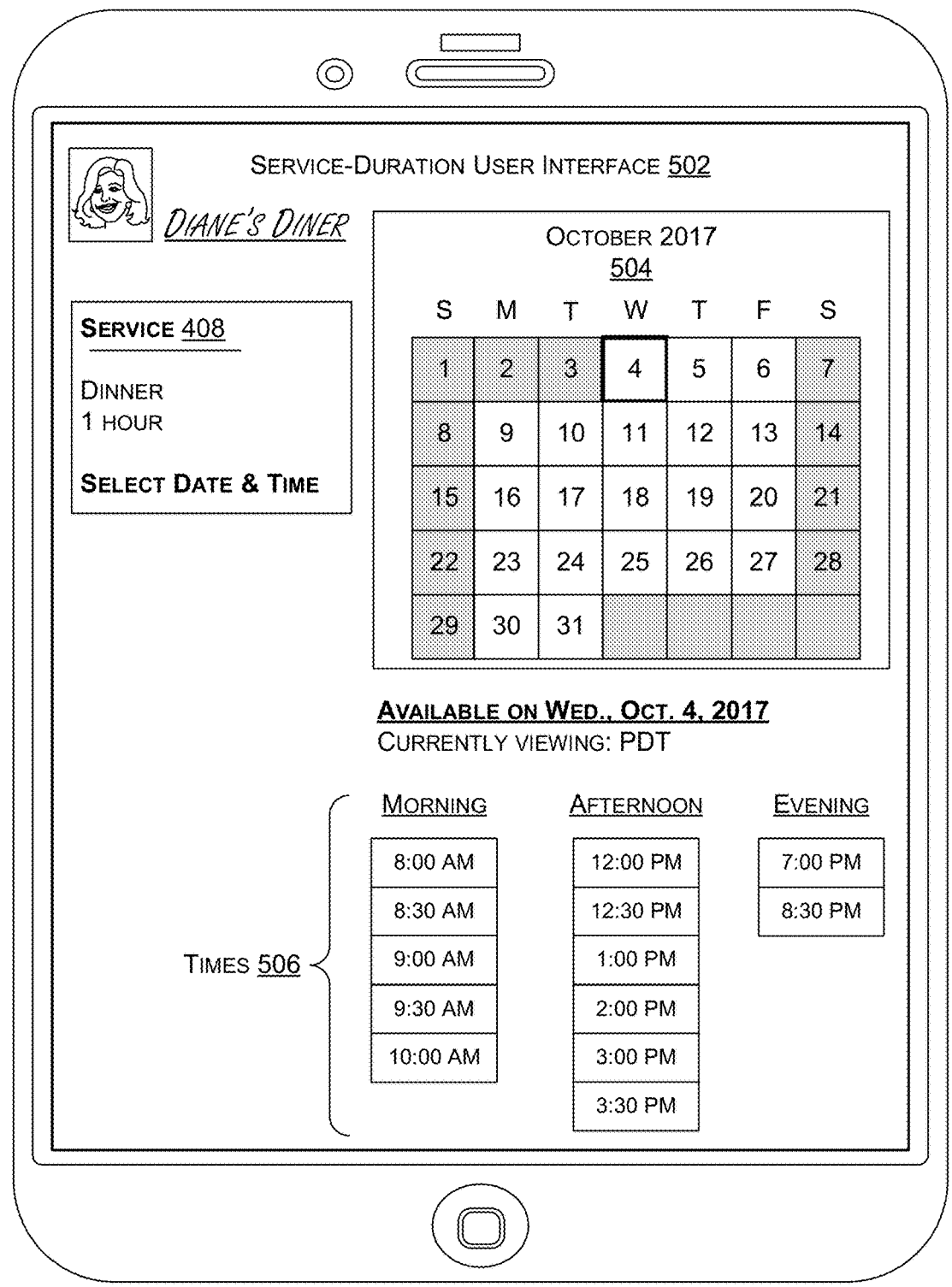
FIG. 5 illustrates an example user interface presented on a device which includes periods of time and dates that a customer may book to receive a service from a merchant.

FIG. 5 illustrates an example service-duration UI 502 presented on a device 500 which includes periods of time and dates that a customer may book to receive a service from a merchant. In some examples, the device 500 may be a merchant device 112, such as a user-facing merchant POS device. In other examples, the device 400 may be a customer device 162. For instance, the service-duration UI 502 may be hosted or otherwise associated with a website of the merchant 102.

The service-duration UI 502 may be presented responsive to the customer 104 inputting a selection to book a service 408 using the service UI 402. In other examples, the service-duration UI 502 may be presented in conjunction with the service UI 402. Generally, the service-duration UI 502 may include dates 504 for which the customer 104 can book the service 408, and times 506 the customer 104 may book the service 408. In some examples, one or both of the dates 504 and times 506 may be determined by duration-identification model(s) 154, and populated by the UI population component 156. For instance, the UI population component 156 may receive indications of the periods of time for performing the services 408 from the duration-identification model(s) 154, and determine, such as from the merchant database(s) 140, dates and times during which the merchant is available or open. Using this data, the UI population component 156 may populate the service-duration UI 502 with the dates 504 and times 506 that customers 104 may book an appointment for the service 408. Upon receiving a selection of a date 504 and time 506 at which the customer 104 would like to schedule an appointment for a service, the service-duration UI 502 may be cause the merchant device 500 to transmit indications of the service 408 selected, the date 504 and the time 506 selected for an appointment, and an indication of the customer 104 who selected the appointment to the service provider 108. The appointments component 132 may then update the appointments database(s) 146 to indicate the booked slot, and further indicate to the merchant 102 that an appointment has been booked. The appointments component 132 may further perform other management functions, such causing the service-duration UI 502 to indicate that the date 504 and time 506 are now booked and unavailable to other customers 104.

In some examples, the service UI 402 and the service-duration UI 502 may comprise the same UI, or any number or combination of UIs. Further, the service UI 402 and the service-duration UI 502 may be presented simultaneously on a display, or be presented on separate pages of a merchant website.

Example Processes

FIGS. 6-9 illustrate flow diagrams of example processes for training and implementing various components/models to determine what items offered for sale by a merchant 102 are services, and periods of time taken to perform these services. The processes are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all the blocks need be executed. For discussion purposes, the processes are described with reference to the environments, architectures and systems described in the examples herein, although the processes may be implemented in a wide variety of other environments, architectures and systems. The process described herein, may be performed by a service provider, a merchant device, a customer device, an additional electronic device, or by a combination thereof.

Figure 6:
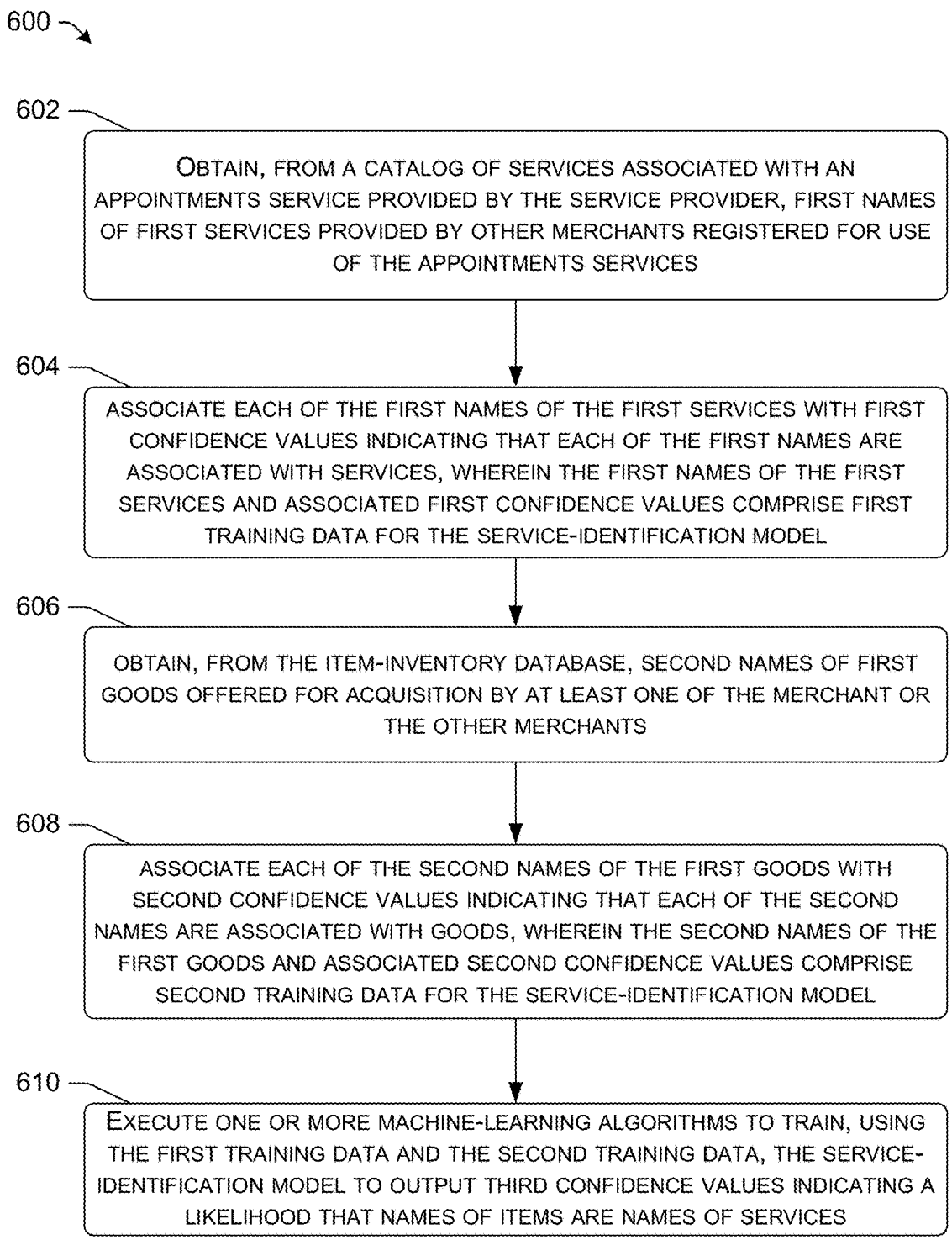
FIG. 6 illustrates a flow diagram of an example process for training a service-identification model to determine whether an item is a service.

FIG. 6 illustrates a flow diagram of an example process 600 for training a service-identification model(s) 150 to determine whether an item is a service.

At 602, the service-identification training component 148 may obtain, from a catalog of services 310 associated with an appointments service provided by the service provider 108, first names of first services provided by other merchants 102 registered for use of the appointments services and/or the payment-processing services. In some examples, the service-identification training component 148 may further obtain other information, such as descriptions of the first services, prices for the first services, industries associated with merchants 102 providing the services, etc.

At 604, the service-identification training component 148 may associate each of the first names of the first services with first confidence values (e.g., 1, 10, 100, etc.) indicating that each of the first names are associated with services, wherein the first names of the first services and associated first confidence values comprise first training data for the service-identification model. In various examples, associating each of the first names of the first services with the confidence values may include assigning the confidence values as metadata for the first names, augmenting/associating the confidence values with the first names in a matrix or other mathematical representation, etc. In some examples, the service-identification training component 148 may further associate, with one or more of the first names of the first services, one or more of the descriptions of the first services, prices for the first services, the industries in which the services are performed, etc.

At 606, the service-identification training component 148 may obtain, from the item-inventory database(s) 144, second names of first goods offered for sale by at least one of the merchant 102 or the other merchants 102. In some examples, the service-identification training component 148 may obtain the second names of the first goods from the catalog(s) of the items 308. The service-identification training component 148 may be configured to determine which of the items are goods based at least in part on determining that the items have corresponding inventories listed in the item-inventory database(s) 144, and/or by analyzing transaction information 116 (e.g., itemized sales) stored in the merchant database(s) 140. In some examples, the service-identification training component 148 may further obtain other information, such as descriptions of the first goods, prices for the first goods, industries associated with merchants 102 providing the goods, etc.

At 608, the service-identification training component 148 may associate each of the second names of the first goods with second confidence values (e.g., 0) indicating that each of the second names are associated with goods, wherein the second names of the first goods and associated second confidence values comprise second training data for the service-identification model(s) 150. In some examples, the second confidence values may indicate that the second names are not associated with services, but instead the second names are names of goods or other items which are not services. For instance, the service-identification training component 148 may correlate, augment, or otherwise associate the names of the first goods with the second confidence values. Further, the service-identification training component 148 may also associate one or more of the second names of the first goods with the other information, such as the descriptions of the first goods, prices for the first goods, industries associated with merchants 102 providing the goods, etc.

At 610, the service-identification training component 148 may execute one or more machine-learning algorithms to train, using the first training data and the second training data, the service-identification model(s) 150 to output third confidence values indicating a likelihood that names of items are names of services. For instance, the service-identification training component 148 may train the service-identification model(s) 150 to determine whether a name of a good, description of the good, price of the good, etc., correspond to services or goods based on the training data. The service-identification training component 148 may further train the service-identification model(s) 150 to determine a threshold confidence value, which may be optimized based on feedback techniques, to be used in comparison with output confidence values to determine whether confidence values are associated with names of services.

Figure 7:
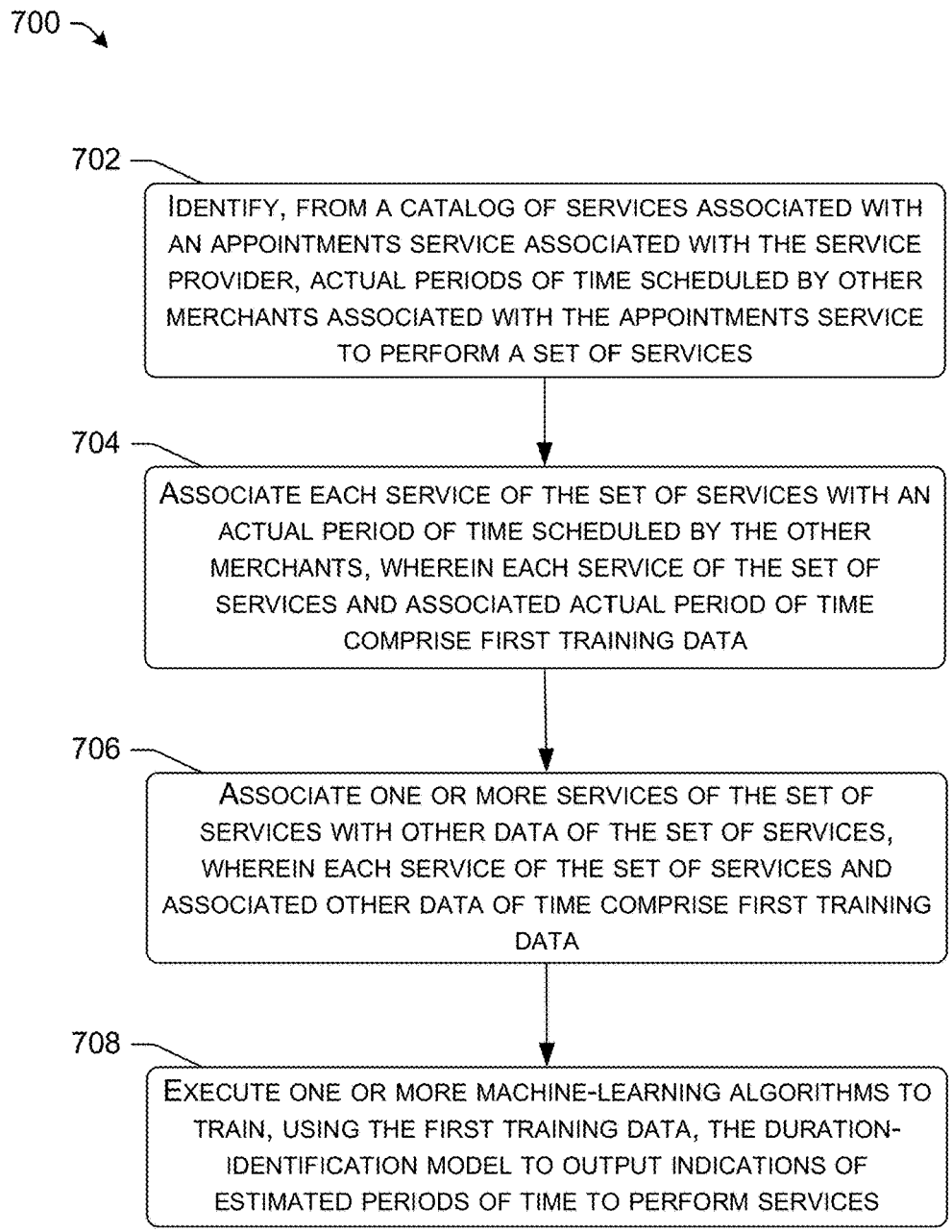
FIG. 7 illustrates a flow diagram of an example process for training a duration-identification model to determine a period of time required by a merchant to perform a service.

FIG. 7 illustrates a flow diagram of an example process 700 for training duration-identification model(s) 154 to determine a period of time taken by a merchant to perform a service.

At 702, the duration-identification training component 152 may identify, from catalog(s) of services 310 associated with an appointments service associated with the service provider 108, actual periods of time scheduled by other merchants 102 associated with the appointments service to perform a set of services. For instance, the duration-identification training component 152 may identify scheduled periods of time that other merchants 102 that use the appointments service have their customer 104 sign up for.

At 704, the duration-identification training component 152 may associate each service of the set of services with an actual period of time scheduled by the other merchants. In some examples, each service of the set of services and associated actual period of time comprise first training data used by the duration-identification training component 152 to train the duration-identification model(s) 154.

At 706, the duration-identification training component 152 may associate one or more services of the set of services with other data of the set of services. For instance, the duration-identification training component 152 may associate one or more of a description of the services, a price of the services, an indication of an employee performing the services, an indication of a customer receiving the services, etc., with one or more of the services. In some examples, some or all of this other data that is associated with the one or more services of the set of services may be included in the first training data.

At 708, the duration-identification training component 152 may execute one or more machine-learning algorithms to train, using the first training data, the duration-identification model to output indications of estimated periods of time to perform services.

Figure 8:
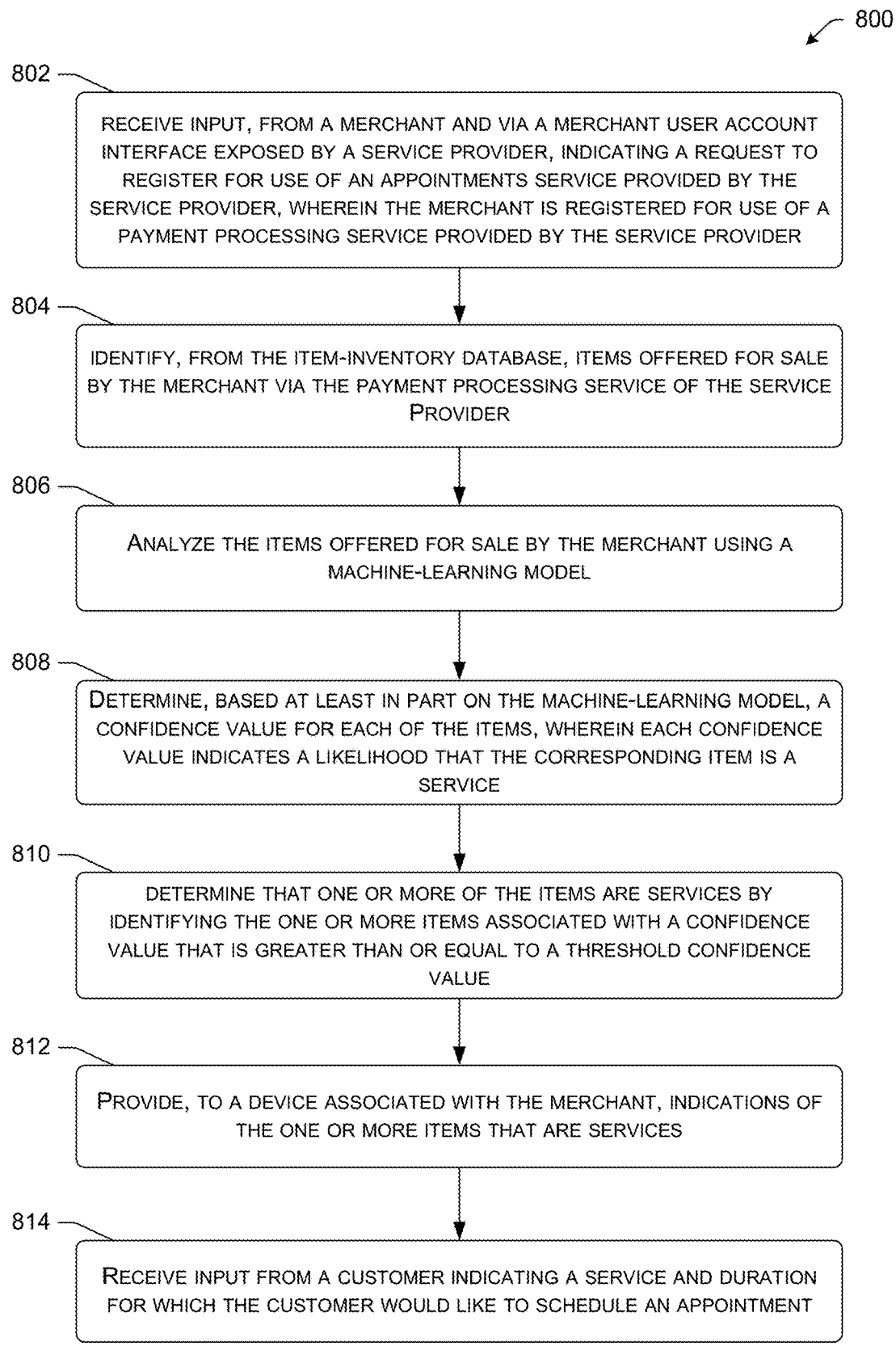
FIG. 8 illustrates a flow diagram of an example process for using a service-identification model to determine whether an item offered for sale by a merchant via a payment-processing service is a service.

FIG. 8 illustrates a flow diagram of an example process 800 for using a service-identification model(s) 150 to determine whether an item offered for sale by a merchant 120 via a payment-processing service is a service, or a good.

At 802, the service provider 108 may receive input, from a merchant 102 and via a merchant user account interface exposed by the service provider 108, indicating a request to register for use of an appointments service provided by the service provider 108. In some examples, the merchant 102 may already be registered for use of a payment-processing service provided by the service provider 108. In such examples, the service provider 108 may store transaction data 116 of the merchant in the merchant database(s) 140, and further stored indications of items, as well as item inventories for the merchant 102, in the item-inventory database(s) 144.

In some examples, the steps 804-812 may be automated and performed by components of the service provider 108 responsive to receiving the request to register for use of the appointments service.

At 804, the appointments component 132 may identify, from the item-inventory database(s) 144 and/or merchant database(s) 140, names of items offered for sale by the merchant via the payment-processing service of the service provider. For instance, the appointments component 132 may analyze, or call, the catalog(s) of items 308. In some examples, the appointments component 132 may further obtain other information, such as prices for the items, descriptions of the items, etc.

At 806, the appointments component 132 may analyze the items offered for sale by the merchant using a machine-learning model. For instance, the appointments component 132 may provide the names of the items offered for sale by the merchant 102 as input into a service-identification model(s) 150. In some examples, the service-identification model(s) 150 may be trained using a first machine-learning algorithm to determine whether an item is a service based on its name. For example, the service-identification training component 148 may obtain first training data to be used by the first machine-learning algorithm to train the service-identification model, where the first training data comprises actual names of services listed in catalog(s) of services 310 associated with the appointments service. For example, the appointments component 132 may identify names of services offered by other merchants 102, and train the service-identification component) 148 using the names of the services, and may further use descriptions of the services and/or prices of the services to train the service-identification model(s) 150.

At 808, the appointments component 132 may determine, based at least in part on the machine-learning model, a confidence value for each of the items. For instance, the appointment component 132 may receive, as output from the service-identification model(s) 150, a confidence value for each of the names of the items. In some examples, each confidence value indicates a likelihood that the corresponding item is a service. For instance, the confidence values may be a value in a range from a good (e.g., a value of 0) to a service (e.g., a value of 1, 10, 100, etc.)

At 810, the appointments component 132 may determine that one or more of the items are services by identifying the one or more items whose names are associated with a confidence value that is greater than or equal to a threshold confidence value. In some examples, the threshold confidence value may indicate a value that indicates that an item is a service if the item's name has a confidence value that is greater than or equal to the threshold confidence value.

At 812, the service provider 108 may provide, to the merchant and/or potential customers, indications of the one or more items that are services. For instance, a UI population component 156 may send user interface data 160 to the merchant devices 112. In some examples, the UI population component 156 may identify a website associated with the merchant, identify a service graphical user interface (GUI) associated with the website, and populate a service menu configured to be presented to a visitor of the merchant website to facilitate user reservation of a service appointment. That is, the service provide may populate, based on receiving an input from the merchant to publish the services or automatically upon identifying services from the set of items to be sold, an interactive interface that enables a user to select services for a determined duration (within the appointments database associated with the merchant, the payment service facilitates the reservation of the service for the specified duration at the selected time).

At 814, a user interface which presents the user interface data 160 may receive input from a customer 104. For example, a customer 104 may access a user interface, via a merchant device 112 and/or a customer device 162, and make a selection of a service for the presented duration. Thus, the customer 104 may provide input which indicates a service and duration that the customer 104 would like to book or schedule. The appointments component 132 may receive the input indicating the service and duration that the customer 104 would like to book or schedule, and schedule that appointment for the customer 104. Further, the appointments component 132 may cause the recently booked service to be removed from the user interface (e.g., the website) to illustrate that the appointment is booked and can no longer be selected by another customer 104. Thus, upon receiving input from a customer 104 via an appointments user interface, the appointments component 132 may automatically (e.g., no input required from the merchant 102) book the appointment for the customer 104, and may further remove the indication of that appointment from the user interface of the merchant.

Figure 9:
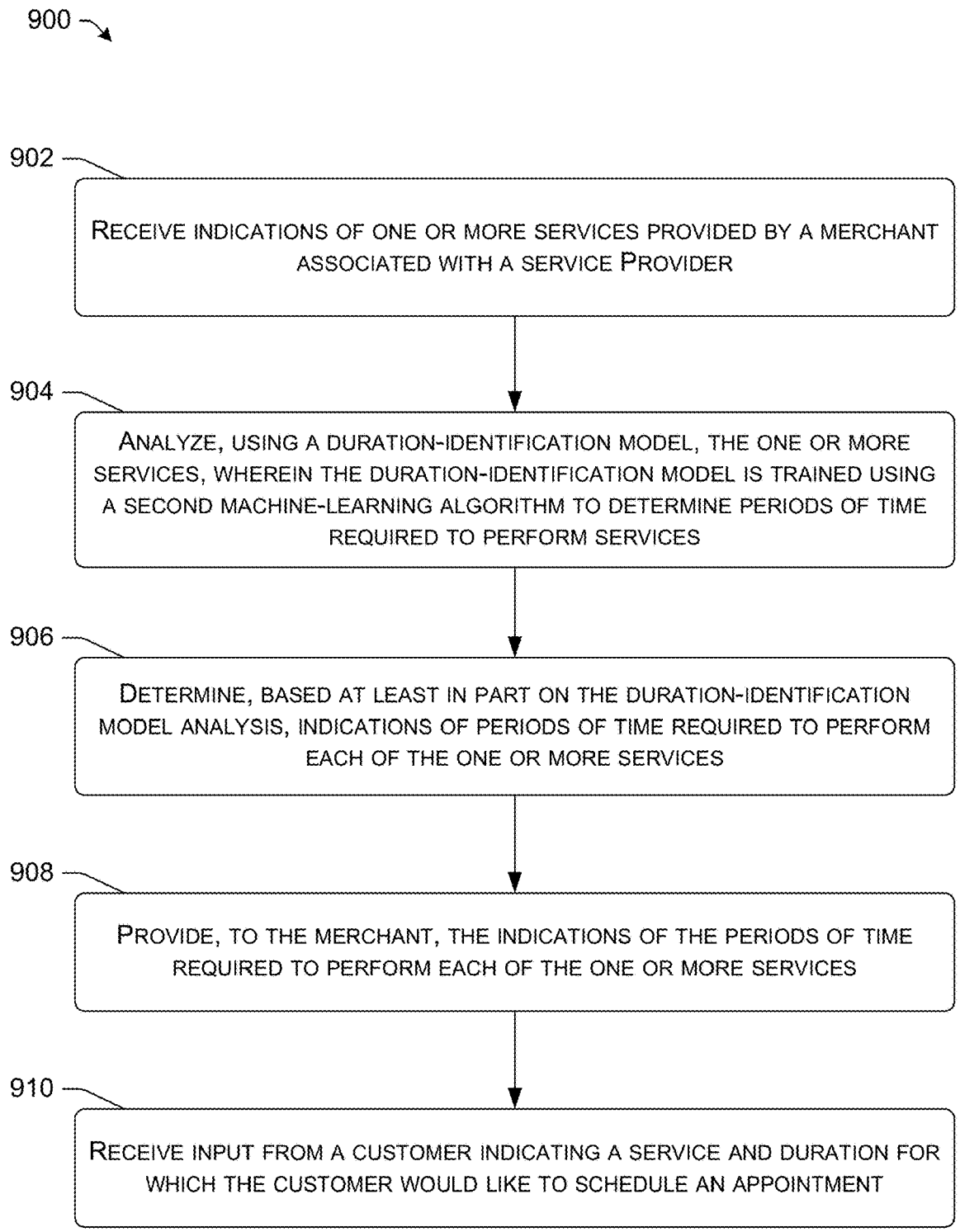
FIG. 9 illustrates a flow diagram of an example process for using a duration-identification model to determine a period of time required by a merchant to provide a service to a customer.

FIG. 9 illustrates a flow diagram of an example process 900 for using duration-identification model(s) 154 to determine a period of time required by a merchant 102 to provide a service to a customer 104. In some examples, the process 900 may begin after step 810 of the process 800

At 902, the appointments component 132 may receive indications (e.g., names) of one or more items provided by a merchant 102 associated with a service provider 108. For instance, the appointments component 132 may receive the names of the one or more items as output from a service-identification model(s) 150.

At 904, the appointments component 132 may analyze, using a duration-identification model, the one or more services. In some examples, the appointments component 132 may provide the names of the one or more items as inputs into a duration-identification model(s) 154. In some examples, the duration-identification model(s) 154 may be trained using a second machine-learning algorithm to determine periods of time to perform services. For instance, a duration-identification training component 152 may obtain second training data to be used by the second machine-learning algorithm, where the second training data includes indications of the periods of time to perform the services provided by the merchants.

At 906, the appointments component 132 may determine, based at least in part on the duration-identification model analysis, indications of periods of time required to perform each of the one or more services. For example, the appointments component 132 may receive, as outputs from the duration-identification model(s) 154, indications of periods of time to perform each of the services of the one or more items.

At 908, the UI population component 156 may provide, to the merchant, the indications of the periods of time to perform each of the services of the one or more items. For instance, the UI population component 156 may send UI data 160 to the merchant devices 112. In some examples, the UI population component 156 may identify a website associated with the merchant, identify a service-duration graphical user interface (GUI) menu associated with the website, and populate the service-duration menu with the indications of the periods of time to perform each of the services.

At 910, the appointments component 132 may receive, via the user interface populated with the service GUI and/or the service-duration GUI, input from a customer 104 indicating a service and duration for which the customer 104 would like to schedule an appointment. For example, a customer 104 may access a user interface, via a merchant device 112 and/or a customer device 162, and make a selection of a service for the presented duration. Thus, the customer 104 may provide input which indicates a service and duration that the customer 104 would like to book or schedule. The appointments component 132 may receive the input indicating the service and duration that the customer 104 would like to book or schedule, and schedule that appointment for the customer 104. Further, the appointments component 132 may cause the recently booked service to be removed from the user interface (e.g., the website) to illustrate that the appointment is booked and can no longer be selected by another customer 104. Thus, upon receiving input from a customer 104 via an appointments user interface, the appointments component 132 may automatically (e.g., no input required from the merchant 102) book the appointment for the customer 104, and may further remove the indication of that appointment from the user interface of the merchant.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A computer-implemented method comprising:
receiving, by one or more computing devices of a payment processing service, transaction data associated with one or more transactions processed by the payment processing service on behalf of a merchant;
generating, by the one or more computing devices of the payment processing service, training data based at least in part on the transaction data, wherein the training data comprises, for individual transactions of the one or more transactions, a service performed, an employee providing the service, and a duration of the service;
training, by the one or more computing devices of the payment processing service, a duration-identification model using the training data, wherein the duration-identification model outputs a duration for a particular service with a particular employee;
receiving, by the one or more computing devices of the payment processing service and from a computing device of a customer, a request for an appointment for the particular service;
determining, by the one or more computing devices of the payment processing service, based at least in part on the duration-identification model and the particular service, a duration of the particular service with the particular employee;
based at least in part on the duration, determining, by the one or more computing devices of the payment processing service, a proposed appointment with the particular employee for the particular service; and
causing presentation of, by the one or more computing devices of the payment processing service, and on a display of the computing device of the customer, a user interface including an indication of the proposed appointment.

2. The computer-implemented method of claim 1, further comprising:
responsive to receiving the request for the appointment, selecting, by the one or more computing devices of the payment processing service, the particular employee performing the particular service based at least in part on one or more shift schedules of the merchant.

3. The computer-implemented method of claim 1, further comprising:
responsive to receiving the request for the appointment, selecting, by the one or more computing devices of the payment processing service, the particular employee performing the particular service based at least in part on historical appointments of the customer.

4. The computer-implemented method of claim 1, wherein the request for the appointment for the particular service includes an indication of the particular employee.

5. The computer-implemented method of claim 1, wherein the indication of the proposed appointment comprises a user interface element selectable to accept the proposed appointment.

6. The computer-implemented method of claim 5, further comprising:
receiving, by the one or more computing devices and from the computing device of the customer, an indication of a selection of the user interface element; and
responsive to receiving the indication of the selection, booking, by the one or more computing devices of the payment processing service, the appointment.

7. The computer-implemented method of claim 1,
wherein the training data further comprises, for individual transactions of the one or more transactions, a customer obtaining the service, and
wherein the duration-identification model outputs a duration for the particular service with the particular employee, specific to the customer.

8. The computer-implemented method of claim 1, wherein the training data further includes information in a merchant profile stored in one or more storage devices associated with the payment processing service.

9. The computer-implemented method of claim 1, further comprising:
determining, by the one or more computing devices of the payment processing service and based at least in part on the duration-identification model, a quantity of timeslots available for appointments for the particular employee in a time period.

10. The computer-implemented method of claim 1, wherein the duration-identification model comprises a first duration-identification model, the method further comprising:
training, by the one or more computing devices of the payment processing service, a second duration-identification model using the training data, wherein the second duration-identification model is specific to a second employee.

11. The computer-implemented method of claim 10, wherein the duration comprises a first duration, the proposed appointment comprises a first proposed appointment, the method further comprising:
determining, by the one or more computing devices of the payment processing service, based at least in part on the second duration-identification model and the particular service, a second duration of the particular service with the second employee; and
based at least in part on the second duration, determining, by the one or more computing devices of the payment processing service, a second proposed appointment with the second employee for the particular service,
wherein the user interface further includes an indication of the second proposed appointment.

12. A computer-implemented method comprising:
receiving, by one or more computing devices of a payment processing service, transaction data associated with one or more transactions processed by the payment processing service on behalf of a merchant;
generating, by the one or more computing devices of the payment processing service, training data based at least in part on the transaction data, wherein the training data comprises, for individual transactions of the one or more transactions, a service performed in the individual transaction, a customer obtaining the service, and a duration of the service;
training, by the one or more computing devices of the payment processing service, a duration-identification model using the training data, wherein the duration-identification model outputs a duration for a particular service for a particular customer;
receiving, by the one or more computing devices of the payment processing service and from a computing device of the particular customer, a request for an appointment for the particular service;
determining, by the one or more computing devices of the payment processing service, based at least in part on the duration-identification model and the particular service, a duration of the particular service for the particular customer;

based at least in part on the duration, determining, by the one or more computing devices of the payment processing service, a proposed appointment for the particular customer for the particular service; and causing presentation of, by the one or more computing devices of the payment processing service, and on a display of the computing device of the particular customer, a user interface including an indication of the proposed appointment.

13. The computer-implemented method of claim 12, further comprising:

responsive to receiving the request for the appointment, selecting, by the one or more computing devices of the payment processing service, an employee to perform the particular service based at least in part on one or more shift schedules of the merchant.

14. The computer-implemented method of claim 12, further comprising:

responsive to receiving the request for the appointment, selecting, by the one or more computing devices of the payment processing service, an employee to perform the particular service based at least in part on historical appointments of the particular customer.

15. The computer-implemented method of claim 12, wherein the indication of the proposed appointment comprises a user interface element selectable to accept the proposed appointment.

16. The computer-implemented method of claim 15, further comprising:

receiving, by the one or more computing devices and from the computing device of the particular customer, an indication of a selection of the user interface element; and responsive to receiving the indication of the selection, booking, by the one or more computing devices of the payment processing service, the appointment.

17. The computer-implemented method of claim 12, wherein the training data further comprises, for individual transactions of the one or more transactions, an employee performing the service, and wherein the duration-identification model outputs a duration for the particular service for the particular customer with a particular employee.

18. The computer-implemented method of claim 12, wherein the duration-identification model comprises a first duration-identification model, the method further comprising:

training, by the one or more computing devices of the payment processing service, a second duration-identification model using the training data, wherein the second duration-identification model is specific to a second customer.

19. A system associated with a payment processing service comprising:

one or more processors; and one or more non-transitory computer-readable media storing instructions executable by the one or more processors, wherein the instructions cause the one or more processors to perform acts comprising:

receiving transaction data associated with one or more transactions processed by the payment processing service on behalf of a merchant;

generating training data based at least in part on the transaction data, wherein the training data comprises, for individual transactions of the one or more transactions, a service performed, an employee providing the service, and a duration of the service;

training a duration-identification model using the training data, wherein the duration-identification model outputs a duration for a particular service with a particular employee;

receiving, from a computing device of a customer, a request for an appointment for the particular service;

determining, based at least in part on the duration-identification model and the particular service, a duration of the particular service with the particular employee;

based at least in part on the duration, determining a proposed appointment with the particular employee for the particular service; and causing presentation of, on a display of the computing device of the customer, a user interface including an indication of the proposed appointment.

20. The system of claim 19, wherein the indication of the proposed appointment comprises a user interface element selectable to accept the proposed appointment.

* * * * *